United States Patent
Black et al.

(10) Patent No.: US 11,228,347 B2
(45) Date of Patent: *Jan. 18, 2022

(54) USER EQUIPMENT ASSISTED MULTIPLE-INPUT MULTIPLE-OUTPUT DOWNLINK CONFIGURATION

(71) Applicant: XCOM Labs, Inc., San Diego, CA (US)

(72) Inventors: Peter John Black, La Jolla, CA (US); Matthew Stuart Grob, La Jolla, CA (US); Michael Mingxi Fan, San Diego, CA (US); Tamer Adel Kadous, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,195

(22) Filed: May 15, 2020

(65) Prior Publication Data

US 2020/0350960 A1     Nov. 5, 2020

Related U.S. Application Data

(63) Continuation of application No. 16/180,869, filed on Nov. 5, 2018, now Pat. No. 10,659,112.

(51) Int. Cl.
*H04B 7/04* (2017.01)
*H04B 7/0413* (2017.01)
(Continued)

(52) U.S. Cl.
CPC .......... *H04B 7/0413* (2013.01); *H04B 7/024* (2013.01); *H04B 17/309* (2015.01)

(58) Field of Classification Search
CPC .... H04B 17/309; H04B 7/0413; H04B 7/022; H04B 7/06; H04B 7/024
(Continued)

(56) References Cited

U.S. PATENT DOCUMENTS 5,469,115 A  11/1995  Peterzell et al.
5,479,475 A  12/1995  Grob et al.
(Continued)

FOREIGN PATENT DOCUMENTS

KR  10-2015-0107776  9/2015
WO  WO 2017/159995   9/2017

OTHER PUBLICATIONS

3GPP RP-170750, New WID: Further Enhancements to Coordinated Multi-Point (CoMP) Operation for LTE, Mar. 2017.
(Continued)

*Primary Examiner* — Emmanuel Bayard
(74) *Attorney, Agent, or Firm* — Knobbe, Martens, Olson & Bear, LLP

(57) ABSTRACT

Aspects of this disclosure relate to user equipment assisted multiple-input multiple-output (MIMO) downlink configuration. Features are described for a user equipment determination of a desired transmission mode and/or active set of serving nodes for wireless communication service(s). The user equipment may submit a request for the desired mode and/or nodes to a network controller such as a baseband unit. The user equipment may subsequently receive a configuration for the requested wireless communication service(s).

22 Claims, 17 Drawing Sheets

(51) Int. Cl.
*H04B 17/309* (2015.01)
*H04B 7/024* (2017.01)

(58) Field of Classification Search
USPC .................................. 375/219, 267, 299, 349
See application file for complete search history.

(56) References Cited

U.S. PATENT DOCUMENTS

| | | |
|---|---|---|
| 5,487,175 A | 1/1996 | Bayley et al. |
| 5,515,177 A | 5/1996 | Propach et al. |
| 5,517,323 A | 5/1996 | Propach et al. |
| 5,539,531 A | 7/1996 | Propach et al. |
| 5,566,000 A | 10/1996 | Propach et al. |
| 5,574,773 A | 11/1996 | Grob et al. |
| 5,590,406 A | 12/1996 | Bayley et al. |
| 5,617,060 A | 4/1997 | Wilson et al. |
| 5,663,807 A | 9/1997 | Propach et al. |
| 5,737,708 A | 4/1998 | Grob et al. |
| 5,748,104 A | 5/1998 | Argyroudis et al. |
| 5,757,858 A | 5/1998 | Black et al. |
| 5,761,204 A | 6/1998 | Grob et al. |
| 5,844,885 A | 12/1998 | Grob et al. |
| 5,864,763 A | 1/1999 | Leung et al. |
| 5,870,431 A | 2/1999 | Easton et al. |
| 5,881,368 A | 3/1999 | Grob et al. |
| 5,884,196 A | 3/1999 | Lekven et al. |
| 5,912,882 A | 6/1999 | Yafuso et al. |
| 5,960,362 A | 9/1999 | Grob et al. |
| 5,983,099 A | 11/1999 | Yao et al. |
| 5,983,114 A | 11/1999 | Yao et al. |
| 6,006,108 A | 12/1999 | Black et al. |
| 6,101,397 A | 8/2000 | Grob et al. |
| 6,107,878 A | 8/2000 | Black |
| 6,134,440 A | 10/2000 | Black |
| 6,147,964 A | 11/2000 | Black et al. |
| 6,181,201 B1 | 1/2001 | Black |
| 6,205,129 B1 | 3/2001 | Esteves et al. |
| 6,208,858 B1 | 3/2001 | Antonio et al. |
| 6,208,873 B1 | 3/2001 | Black et al. |
| 6,215,779 B1 | 4/2001 | Bender et al. |
| 6,246,885 B1 | 6/2001 | Black et al. |
| 6,285,861 B1 | 9/2001 | Bonaccorso et al. |
| 6,360,100 B1 | 3/2002 | Grob et al. |
| 6,363,102 B1 | 3/2002 | Ling et al. |
| 6,366,779 B1 | 4/2002 | Bender et al. |
| 6,397,070 B1 | 5/2002 | Black |
| 6,426,971 B1 | 7/2002 | Wu et al. |
| 6,434,376 B1 | 8/2002 | Black |
| 6,449,490 B1 | 9/2002 | Chaponniere et al. |
| 6,535,523 B1 | 3/2003 | Karmi et al. |
| 6,535,918 B1 | 3/2003 | Bender et al. |
| 6,556,549 B1 | 4/2003 | Bender et al. |
| 6,560,211 B2 | 5/2003 | Esteves et al. |
| 6,574,211 B2 | 6/2003 | Padovani et al. |
| 6,594,501 B2 | 7/2003 | Black et al. |
| 6,633,552 B1 | 10/2003 | Ling et al. |
| 6,636,568 B2 | 10/2003 | Kadous |
| 6,661,833 B1 | 12/2003 | Black et al. |
| 6,665,272 B1 | 12/2003 | Pankaj et al. |
| 6,678,257 B1 | 1/2004 | Vijayan et al. |
| 6,680,925 B2 | 1/2004 | Wu et al. |
| 6,680,926 B2 | 1/2004 | Bender et al. |
| 6,680,968 B2 | 1/2004 | Black et al. |
| 6,687,510 B2 | 2/2004 | Esteves et al. |
| 6,693,920 B2 | 2/2004 | Montojo et al. |
| 6,694,469 B1 | 2/2004 | Jalali et al. |
| 6,714,526 B2 | 3/2004 | Wei et al. |
| 6,714,780 B1 | 3/2004 | Antonio et al. |
| 6,725,028 B2 | 4/2004 | Bonaccorso et al. |
| 6,738,608 B2 | 5/2004 | Black et al. |
| 6,741,861 B2 | 5/2004 | Bender et al. |
| 6,748,201 B2 | 6/2004 | Black et al. |
| 6,757,520 B2 | 6/2004 | Attar et al. |
| 6,798,736 B1 | 9/2004 | Black et al. |
| 6,801,580 B2 | 10/2004 | Kadous |
| 6,804,210 B2 | 10/2004 | Bender et al. |
| 6,807,161 B2 | 10/2004 | Bender et al. |
| 6,813,478 B2 | 11/2004 | Glazko et al. |
| 6,850,769 B2 | 2/2005 | Grob et al. |
| 6,873,606 B2 | 3/2005 | Agrawal et al. |
| 6,894,994 B1 | 5/2005 | Grob et al. |
| 6,914,965 B1 | 7/2005 | Grob et al. |
| 6,917,821 B2 | 7/2005 | Kadous et al. |
| 6,920,504 B2 | 7/2005 | Bender et al. |
| 6,928,062 B2 | 8/2005 | Krishnan et al. |
| 6,965,613 B2 | 11/2005 | Karmi et al. |
| 6,980,514 B2 | 12/2005 | Grob et al. |
| 6,985,516 B1 | 1/2006 | Easton et al. |
| 6,987,778 B2 | 1/2006 | Sindhushayana et al. |
| 7,010,073 B2 | 3/2006 | Black et al. |
| 7,020,073 B2 | 3/2006 | Kadous et al. |
| 7,020,225 B2 | 3/2006 | Sindhushayana et al. |
| 7,039,001 B2 | 5/2006 | Krishnan et al. |
| 7,042,857 B2 | 5/2006 | Krishnan et al. |
| 7,051,268 B1 | 5/2006 | Sindhushayana et al. |
| 7,068,707 B2 | 6/2006 | Bender et al. |
| 7,069,037 B2 | 6/2006 | Lott et al. |
| 7,072,628 B2 | 7/2006 | Agashe et al. |
| 7,079,550 B2 | 7/2006 | Padovani et al. |
| 7,088,701 B1 | 8/2006 | Attar et al. |
| 7,088,957 B2 | 8/2006 | Ling et al. |
| 7,095,790 B2 | 8/2006 | Krishnan et al. |
| 7,106,782 B2 | 9/2006 | Howard et al. |
| 7,123,922 B2 | 10/2006 | Chaponniere et al. |
| 7,127,654 B2 | 10/2006 | Jalali et al. |
| 7,130,282 B2 | 10/2006 | Black |
| 7,133,437 B2 | 11/2006 | Black et al. |
| 7,145,940 B2 | 12/2006 | Gore et al. |
| 7,149,264 B2 | 12/2006 | Black et al. |
| 7,155,246 B2 | 12/2006 | Bhushan et al. |
| 7,167,684 B2 | 1/2007 | Kadous et al. |
| 7,177,351 B2 | 2/2007 | Kadous |
| 7,177,648 B2 | 2/2007 | Attar et al. |
| 7,181,666 B2 | 2/2007 | Grob et al. |
| 7,184,426 B2 | 2/2007 | Padovani et al. |
| 7,184,713 B2 | 2/2007 | Kadous et al. |
| 7,194,041 B2 | 3/2007 | Kadous |
| 7,206,580 B2 | 4/2007 | Black |
| 7,206,598 B2 | 4/2007 | Attar et al. |
| 7,209,517 B2 | 4/2007 | Sindhushayana et al. |
| 7,228,148 B2 | 6/2007 | Esteves et al. |
| 7,233,794 B2 | 6/2007 | Grob et al. |
| 7,236,535 B2 | 6/2007 | Subramaniam et al. |
| 7,239,622 B2 | 7/2007 | Black |
| 7,239,847 B2 | 7/2007 | Attar et al. |
| 7,248,572 B2 | 7/2007 | Bender et al. |
| 7,251,229 B2 | 7/2007 | Montojo et al. |
| 7,266,156 B2 | 9/2007 | Montojo et al. |
| 7,289,473 B1 | 10/2007 | Padovani et al. |
| 7,295,857 B2 | 11/2007 | Joshi et al. |
| 7,315,531 B2 | 1/2008 | Black et al. |
| 7,369,549 B2 | 5/2008 | Wu et al. |
| 7,376,209 B2 | 5/2008 | Namgoong et al. |
| 7,382,744 B2 | 6/2008 | Bhushan et al. |
| 7,411,930 B2 | 8/2008 | Montojo et al. |
| 7,418,046 B2 | 8/2008 | Gore et al. |
| 7,428,269 B2 | 9/2008 | Sampath et al. |
| 7,450,943 B2 | 11/2008 | Black et al. |
| 7,457,639 B2 | 11/2008 | Subramaniam et al. |
| 7,463,576 B2 | 12/2008 | Krishnan et al. |
| 7,477,693 B2 | 1/2009 | Subramaniam et al. |
| 7,483,699 B2 | 1/2009 | Karmi et al. |
| 7,499,427 B2 | 3/2009 | Padovani et al. |
| 7,508,748 B2 | 3/2009 | Kadous |
| 7,525,909 B2 | 4/2009 | Fan et al. |
| 7,539,496 B1 | 5/2009 | Sousa |
| 7,539,507 B2 | 5/2009 | Grob et al. |
| 7,564,775 B2 | 7/2009 | Jayaraman et al. |
| 7,564,794 B2 | 7/2009 | Montojo et al. |
| 7,564,818 B2 | 7/2009 | Black et al. |
| 7,567,621 B2 | 7/2009 | Sampath et al. |
| 7,580,709 B2 | 8/2009 | Black |
| 7,596,090 B2 | 9/2009 | Black |
| 7,596,098 B2 | 9/2009 | Karmi et al. |

(56) References Cited

U.S. PATENT DOCUMENTS

| | | |
|---|---|---|
| 7,599,329 B2 | 10/2009 | Karmi et al. |
| 7,606,326 B2 | 10/2009 | Krishnan et al. |
| 7,609,773 B2 | 10/2009 | Bhushan et al. |
| 7,613,978 B2 | 11/2009 | Jalali et al. |
| 7,620,005 B2 | 11/2009 | Wei et al. |
| 7,630,719 B2 | 12/2009 | Bender et al. |
| 7,646,802 B2 | 1/2010 | Black et al. |
| 7,668,125 B2 | 2/2010 | Kadous |
| 7,672,383 B2 | 3/2010 | Namgoong et al. |
| 7,675,886 B2 | 3/2010 | Agrawal et al. |
| 7,693,213 B2 | 4/2010 | Sindhushayana et al. |
| 7,715,356 B2 | 5/2010 | Bender et al. |
| 7,719,991 B2 | 5/2010 | Bhushan et al. |
| 7,729,714 B2 | 6/2010 | Black et al. |
| 7,738,906 B2 | 6/2010 | Attar et al. |
| 7,742,447 B2 | 6/2010 | Joshi et al. |
| 7,796,563 B2 | 9/2010 | Wu et al. |
| 7,817,677 B2 | 10/2010 | Black et al. |
| 7,817,760 B2 | 10/2010 | Black et al. |
| 7,826,441 B2 | 11/2010 | Black et al. |
| 7,830,900 B2 | 11/2010 | Black et al. |
| 7,835,695 B2 | 11/2010 | Ling et al. |
| 7,848,282 B2 | 12/2010 | Padovani et al. |
| 7,848,283 B2 | 12/2010 | Padovani et al. |
| 7,848,284 B2 | 12/2010 | Padovani et al. |
| 7,848,285 B2 | 12/2010 | Padovani et al. |
| 7,848,298 B2 | 12/2010 | Attar et al. |
| 7,869,387 B2 | 1/2011 | Black |
| 7,876,265 B2 | 1/2011 | Black et al. |
| 7,890,144 B2 | 2/2011 | Subramaniam et al. |
| 7,893,873 B2 | 2/2011 | Black et al. |
| 7,903,615 B2 | 3/2011 | Gorokhov et al. |
| 7,924,753 B2 | 4/2011 | Attar et al. |
| 7,940,663 B2 | 5/2011 | Kadous |
| 7,948,959 B2 | 5/2011 | Wang et al. |
| 7,953,062 B2 | 5/2011 | Sindhushayana et al. |
| 7,961,592 B2 | 6/2011 | Black et al. |
| 7,974,359 B2 | 7/2011 | Gorokhov et al. |
| 7,995,531 B2 | 8/2011 | Padovani et al. |
| 7,995,684 B2 | 8/2011 | Montojo et al. |
| 8,005,042 B2 | 8/2011 | Padovani et al. |
| 8,009,625 B2 | 8/2011 | Padovani et al. |
| 8,010,113 B2 | 8/2011 | Black |
| 8,014,331 B2 | 9/2011 | Sarkar et al. |
| 8,040,942 B2 | 10/2011 | Bhushan et al. |
| 8,050,198 B2 | 11/2011 | Bhushan et al. |
| 8,060,129 B2 | 11/2011 | Grob et al. |
| 8,073,068 B2 | 12/2011 | Kim et al. |
| 8,077,654 B2 | 12/2011 | Sutivong et al. |
| 8,077,655 B2 | 12/2011 | Padovani et al. |
| 8,077,691 B2 | 12/2011 | Kadous et al. |
| 8,085,678 B2 | 12/2011 | Spindola et al. |
| 8,089,924 B2 | 1/2012 | Padovani et al. |
| 8,094,623 B2 | 1/2012 | Attar et al. |
| 8,094,740 B2 | 1/2012 | Bhushan et al. |
| 8,098,767 B2 | 1/2012 | Mirbagheri et al. |
| 8,102,872 B2 | 1/2012 | Spindola et al. |
| 8,107,517 B2 | 1/2012 | Naguib et al. |
| 8,111,663 B2 | 2/2012 | Black |
| 8,116,283 B2 | 2/2012 | Black et al. |
| 8,126,072 B2 | 2/2012 | Namgoong et al. |
| 8,139,672 B2 | 3/2012 | Gore et al. |
| 8,160,596 B2 | 4/2012 | Black et al. |
| 8,165,619 B2 | 4/2012 | Attar et al. |
| 8,175,594 B2 | 5/2012 | Attar et al. |
| 8,189,540 B2 | 5/2012 | Padovani et al. |
| 8,203,961 B2 | 6/2012 | Yavuz et al. |
| 8,204,530 B2 | 6/2012 | Gorokhov et al. |
| 8,208,936 B2 | 6/2012 | Lindoff et al. |
| 8,213,390 B2 | 7/2012 | Black et al. |
| 8,218,573 B2 | 7/2012 | Bhushan et al. |
| 8,229,423 B2 | 7/2012 | Sarkar et al. |
| 8,274,948 B2 | 9/2012 | Bender et al. |
| 8,306,096 B2 | 11/2012 | Sampath et al. |
| 8,311,027 B2 | 11/2012 | Padovani et al. |
| 8,331,310 B2 | 12/2012 | Wang et al. |
| 8,331,377 B2 | 12/2012 | Attar et al. |
| 8,331,385 B2 | 12/2012 | Black et al. |
| 8,331,892 B2 | 12/2012 | Kadous et al. |
| 8,351,372 B2 | 1/2013 | Padovani et al. |
| 8,351,456 B2 | 1/2013 | Kadous et al. |
| 8,363,697 B2 | 1/2013 | Grob et al. |
| 8,375,261 B2 | 2/2013 | Shi et al. |
| 8,385,433 B2 | 2/2013 | Wang et al. |
| 8,385,465 B2 | 2/2013 | Kadous et al. |
| 8,385,923 B2 | 2/2013 | Attar et al. |
| 8,391,196 B2 | 3/2013 | Gorokhov et al. |
| 8,391,227 B2 | 3/2013 | Choi et al. |
| 8,391,337 B2 | 3/2013 | Black et al. |
| 8,391,413 B2 | 3/2013 | Mantravadi et al. |
| 8,396,152 B2 | 3/2013 | Attar et al. |
| 8,406,774 B2 | 3/2013 | Yavuz et al. |
| 8,411,594 B2 | 4/2013 | Black |
| 8,412,227 B2 | 4/2013 | Edge et al. |
| 8,416,756 B2 | 4/2013 | Bhushan et al. |
| 8,451,740 B2 | 5/2013 | Sampath et al. |
| 8,451,776 B2 | 5/2013 | Dayal et al. |
| 8,452,011 B2 | 5/2013 | Guo et al. |
| 8,457,152 B2 | 6/2013 | Gorokhov et al. |
| 8,462,859 B2 | 6/2013 | Sampath et al. |
| 8,472,322 B2 | 6/2013 | Black et al. |
| 8,483,223 B2 | 7/2013 | Black et al. |
| 8,487,478 B2 | 7/2013 | Kirby et al. |
| 8,493,942 B2 | 7/2013 | Luo et al. |
| 8,494,593 B2 | 7/2013 | Black et al. |
| 8,498,192 B2 | 7/2013 | Bhushan et al. |
| 8,514,988 B2 | 8/2013 | Wu et al. |
| 8,537,875 B2 | 9/2013 | Soriaga et al. |
| 8,537,923 B2 | 9/2013 | Lee et al. |
| RE44,577 E | 11/2013 | Yafuso et al. |
| 8,576,760 B2 | 11/2013 | Gorokhov et al. |
| 8,582,621 B2 | 11/2013 | Grob et al. |
| 8,583,137 B2 | 11/2013 | Rezaiifar et al. |
| 8,588,777 B2 | 11/2013 | Grob et al. |
| 8,594,252 B2 | 11/2013 | Black et al. |
| 8,605,729 B2 | 12/2013 | Dayal et al. |
| 8,605,801 B2 | 12/2013 | Rezaiifar et al. |
| 8,611,303 B2 | 12/2013 | Rezaiifar et al. |
| 8,611,305 B2 | 12/2013 | Black et al. |
| 8,611,310 B2 | 12/2013 | Black et al. |
| 8,611,325 B2 | 12/2013 | Black et al. |
| 8,611,815 B2 | 12/2013 | Mohammadian et al. |
| 8,619,717 B2 | 12/2013 | Agrawal et al. |
| 8,619,835 B2 | 12/2013 | Grob et al. |
| 8,630,602 B2 | 1/2014 | Attar et al. |
| 8,634,435 B2 | 1/2014 | Kadous et al. |
| 8,634,438 B2 | 1/2014 | Nanda et al. |
| 8,635,645 B2 | 1/2014 | Krishnamoorthi et al. |
| 8,638,758 B2 | 1/2014 | Black |
| 8,639,190 B2 | 1/2014 | Gore et al. |
| 8,654,705 B2 | 2/2014 | Wang et al. |
| 8,654,715 B2 | 2/2014 | Wang et al. |
| 8,655,400 B2 | 2/2014 | Kadous et al. |
| 8,665,880 B2 | 3/2014 | Yavuz et al. |
| 8,676,209 B2 | 3/2014 | Gorokhov et al. |
| 8,700,083 B2 | 4/2014 | Yavuz et al. |
| 8,712,461 B2 | 4/2014 | Yavuz et al. |
| 8,724,545 B2 | 5/2014 | Dayal et al. |
| 8,724,555 B2 | 5/2014 | Krishnan et al. |
| 8,732,272 B2 | 5/2014 | Deshpande et al. |
| 8,737,538 B2 | 5/2014 | Grob et al. |
| 8,737,911 B2 | 5/2014 | Black et al. |
| 8,743,751 B2 | 6/2014 | Li et al. |
| 8,743,909 B2 | 6/2014 | Black et al. |
| 8,744,018 B2 | 6/2014 | Chen et al. |
| 8,755,350 B2 | 6/2014 | Grob et al. |
| 8,760,994 B2 | 6/2014 | Wang et al. |
| 8,767,885 B2 | 7/2014 | Sampath et al. |
| 8,773,308 B2 | 7/2014 | Black et al. |
| 8,810,194 B2 | 8/2014 | Kirby et al. |
| 8,818,274 B2 | 8/2014 | Grob et al. |
| 8,824,979 B2 | 9/2014 | Yavuz et al. |
| 8,825,860 B2 | 9/2014 | Linsky et al. |
| 8,830,934 B2 | 9/2014 | Banister et al. |

(56) References Cited

U.S. PATENT DOCUMENTS

| | | |
|---|---|---|
| 8,831,156 B2 | 9/2014 | Liang et al. |
| 8,839,079 B2 | 9/2014 | Chen et al. |
| 8,842,693 B2 | 9/2014 | Agrawal et al. |
| 8,848,607 B2 | 9/2014 | Wang et al. |
| 8,854,944 B2 | 10/2014 | Jou et al. |
| 8,855,001 B2 | 10/2014 | Gorokhov et al. |
| 8,867,456 B2 | 10/2014 | Yavuz et al. |
| 8,868,118 B2 | 10/2014 | Rezaiifar et al. |
| 8,873,534 B2 | 10/2014 | Sindhushayana et al. |
| 8,878,393 B2 | 11/2014 | Kirby et al. |
| 8,879,440 B2 | 11/2014 | Guo et al. |
| 8,879,445 B2 | 11/2014 | Sadek et al. |
| 8,885,744 B2 | 11/2014 | Kadous et al. |
| 8,886,126 B2 | 11/2014 | Mantravadi et al. |
| 8,886,239 B2 | 11/2014 | Dayal et al. |
| 8,891,436 B2 | 11/2014 | Zhang et al. |
| 8,892,035 B2 | 11/2014 | Mohammadian et al. |
| 8,897,181 B2 | 11/2014 | Wang et al. |
| 8,897,188 B2 | 11/2014 | Black et al. |
| 8,897,220 B2 | 11/2014 | Kadous et al. |
| 8,897,256 B2 | 11/2014 | Cherian et al. |
| 8,903,021 B2 | 12/2014 | Mantravadi et al. |
| 8,908,496 B2 | 12/2014 | Kadous |
| 8,923,109 B2 | 12/2014 | Wang et al. |
| 8,923,125 B2 | 12/2014 | Lott et al. |
| 8,923,208 B2 | 12/2014 | Dayal et al. |
| 8,929,908 B2 | 1/2015 | Agrawal et al. |
| 8,948,095 B2 | 2/2015 | Black et al. |
| 8,948,147 B2 | 2/2015 | Zheng et al. |
| 8,954,063 B2 | 2/2015 | Sarkar et al. |
| 8,963,486 B2 | 2/2015 | Kirby et al. |
| 8,966,001 B2 | 2/2015 | Rauber et al. |
| 8,971,461 B2 | 3/2015 | Sampath et al. |
| 8,971,811 B2 | 3/2015 | Grob et al. |
| 8,971,823 B2 | 3/2015 | Gore et al. |
| 8,983,480 B2 | 3/2015 | Rezaiifar et al. |
| 8,989,794 B2 | 3/2015 | Yavuz et al. |
| 8,995,417 B2 | 3/2015 | Jou et al. |
| 9,001,735 B2 | 4/2015 | Padovani et al. |
| 9,007,942 B2 | 4/2015 | Zhao et al. |
| 9,014,152 B2 | 4/2015 | Jou et al. |
| 9,037,134 B2 | 5/2015 | Grob et al. |
| 9,055,545 B2 | 6/2015 | Black et al. |
| 9,059,785 B2 | 6/2015 | Fertonani et al. |
| 9,066,306 B2 | 6/2015 | Yavuz et al. |
| 9,071,344 B2 | 6/2015 | Smee et al. |
| 9,072,102 B2 | 6/2015 | Yavuz et al. |
| 9,078,269 B2 | 7/2015 | Yavuz et al. |
| 9,088,389 B2 | 7/2015 | Gorokhov et al. |
| 9,106,287 B2 | 8/2015 | Wang et al. |
| 9,113,488 B2 | 8/2015 | Oguz et al. |
| 9,118,387 B2 | 8/2015 | Padovani et al. |
| 9,119,026 B2 | 8/2015 | Black et al. |
| 9,119,217 B2 | 8/2015 | Black et al. |
| 9,124,344 B2 | 9/2015 | Padovani et al. |
| 9,131,420 B2 | 9/2015 | Rezaiifar et al. |
| 9,136,958 B2 | 9/2015 | Walker et al. |
| 9,136,974 B2 | 9/2015 | Gorokhov et al. |
| 9,137,806 B2 | 9/2015 | Yavuz et al. |
| 9,143,957 B2 | 9/2015 | Sadek et al. |
| 9,144,036 B2 | 9/2015 | Gorokhov et al. |
| 9,144,084 B2 | 9/2015 | Sadek et al. |
| 9,148,256 B2 | 9/2015 | Sampath et al. |
| 9,154,179 B2 | 10/2015 | Gudem et al. |
| 9,154,211 B2 | 10/2015 | Sampath et al. |
| 9,155,106 B2 | 10/2015 | Krishnan et al. |
| 9,161,232 B2 | 10/2015 | Linsky et al. |
| 9,161,233 B2 | 10/2015 | Wang et al. |
| 9,172,402 B2 | 10/2015 | Gudem et al. |
| 9,172,453 B2 | 10/2015 | Wang et al. |
| 9,178,632 B2 | 11/2015 | Grob et al. |
| 9,179,319 B2 | 11/2015 | Gore et al. |
| 9,184,870 B2 | 11/2015 | Sampath et al. |
| 9,185,718 B2 | 11/2015 | Kadous et al. |
| 9,185,720 B2 | 11/2015 | Mantravadi et al. |
| 9,198,053 B2 | 11/2015 | Edge et al. |
| 9,204,437 B2 | 12/2015 | Smee et al. |
| 9,226,173 B2 | 12/2015 | Sadek et al. |
| 9,246,560 B2 | 1/2016 | Sampath et al. |
| 9,253,658 B2 | 2/2016 | Sadek et al. |
| 9,264,972 B2 | 2/2016 | Fan et al. |
| 9,277,564 B2 | 3/2016 | Wang et al. |
| 9,282,462 B2 | 3/2016 | Dayal et al. |
| 9,288,814 B2 | 3/2016 | Yavuz et al. |
| 9,294,932 B2 | 3/2016 | Walker et al. |
| 9,307,544 B2 | 4/2016 | Gore et al. |
| 9,312,995 B2 | 4/2016 | Baligh et al. |
| 9,344,973 B2 | 5/2016 | Yavuz et al. |
| 9,363,764 B2 | 6/2016 | Black et al. |
| 9,374,791 B2 | 6/2016 | Yavuz et al. |
| 9,398,602 B2 | 7/2016 | Kadous et al. |
| 9,407,327 B2 | 8/2016 | Kirby et al. |
| 9,408,165 B2 | 8/2016 | Jou et al. |
| 9,408,220 B2 | 8/2016 | Gore et al. |
| 9,419,751 B2 | 8/2016 | Sindhushayana et al. |
| 9,450,638 B2 | 9/2016 | Yan et al. |
| 9,451,480 B2 | 9/2016 | Huang et al. |
| 9,461,736 B2 | 10/2016 | Bhushan et al. |
| 9,474,075 B2 | 10/2016 | Yavuz et al. |
| 9,491,722 B2 | 11/2016 | Yavuz et al. |
| 9,497,495 B2 | 11/2016 | Krishnamoorthi et al. |
| 9,503,134 B2 | 11/2016 | Sadek et al. |
| 9,509,452 B2 | 11/2016 | Liang et al. |
| 9,525,477 B1 | 12/2016 | Wu et al. |
| 9,578,649 B2 | 2/2017 | Dayal et al. |
| 9,585,150 B2 | 2/2017 | Marsh et al. |
| 9,585,156 B2 | 2/2017 | Bhattad et al. |
| 9,609,649 B2 | 3/2017 | Fan et al. |
| 9,660,776 B2 | 5/2017 | Kadous et al. |
| 9,667,817 B2 | 5/2017 | Grob et al. |
| 9,673,837 B2 | 6/2017 | Xue et al. |
| 9,713,165 B2 | 7/2017 | Nammi |
| 9,730,227 B2 | 8/2017 | Marsh et al. |
| 9,750,014 B2 | 8/2017 | Sadek et al. |
| 9,788,361 B2 | 10/2017 | Valliappan et al. |
| 9,832,785 B2 | 11/2017 | Kadous et al. |
| 9,853,699 B2 | 12/2017 | Jalloul et al. |
| 9,860,033 B2 | 1/2018 | Kadous et al. |
| 9,867,194 B2 | 1/2018 | Kadous et al. |
| 9,893,800 B2 | 2/2018 | Wu et al. |
| 9,900,856 B2 | 2/2018 | Wu et al. |
| 9,924,368 B2 | 3/2018 | Valliappan et al. |
| 9,924,436 B2 | 3/2018 | Grob et al. |
| 9,936,400 B2 | 4/2018 | Lee et al. |
| 9,949,279 B2 | 4/2018 | Simonsson et al. |
| 9,954,668 B2 | 4/2018 | Lee et al. |
| 9,955,476 B2 | 4/2018 | Black et al. |
| 9,991,747 B2 | 6/2018 | Toncich et al. |
| 9,991,986 B2 | 6/2018 | Sindhushayana et al. |
| 10,044,426 B1 | 8/2018 | Pawar et al. |
| 10,044,438 B2 | 8/2018 | Kadous et al. |
| 10,044,459 B2 | 8/2018 | Chendamarai et al. |
| 10,075,313 B2 | 9/2018 | Black |
| 10,091,789 B2 | 10/2018 | Valliappan et al. |
| 10,178,649 B2 | 1/2019 | Liu |
| 10,182,404 B2 | 1/2019 | Prakash |
| 10,201,014 B2 | 2/2019 | Kadous |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 10,432,272 B1 | 10/2019 | Black et al. |
| 10,659,112 B1* | 5/2020 | Black .................. H04B 17/318 |
| 10,756,860 B2 | 8/2020 | Black et al. |
| 10,812,216 B2 | 10/2020 | Black et al. |
| 2001/0024437 A1 | 9/2001 | Bender et al. |
| 2002/0173315 A1 | 11/2002 | Chmaytelli et al. |
| 2003/0054807 A1* | 3/2003 | Hsu .................. H04W 72/005 455/414.1 |
| 2003/0145119 A1 | 7/2003 | Bender et al. |
| 2003/0193889 A1 | 10/2003 | Jacobsen |
| 2004/0110525 A1 | 6/2004 | Black et al. |
| 2004/0121730 A1 | 6/2004 | Kadous et al. |

(56) References Cited

U.S. PATENT DOCUMENTS

| | | |
|---|---|---|
| 2006/0067273 A1 | 3/2006 | Suman et al. |
| 2006/0203794 A1 | 9/2006 | Sampath et al. |
| 2006/0229089 A1 | 10/2006 | Tokgoz et al. |
| 2007/0041457 A1 | 2/2007 | Kadous et al. |
| 2007/0066232 A1 | 3/2007 | Black |
| 2007/0071147 A1 | 3/2007 | Sampath et al. |
| 2007/0076663 A1 | 4/2007 | Qi et al. |
| 2007/0165738 A1 | 7/2007 | Barriac et al. |
| 2008/0025241 A1 | 1/2008 | Bhushan et al. |
| 2008/0032740 A1 | 2/2008 | Joshi et al. |
| 2008/0112495 A1 | 5/2008 | Gore et al. |
| 2008/0198911 A1 | 8/2008 | Hui |
| 2008/0268844 A1 | 10/2008 | Ma et al. |
| 2009/0080499 A1 | 3/2009 | Yavuz et al. |
| 2009/0163209 A1 | 6/2009 | Black et al. |
| 2009/0196174 A1 | 8/2009 | Ji |
| 2010/0003931 A1 | 1/2010 | Krishnan et al. |
| 2010/0046497 A1 | 2/2010 | Jalali et al. |
| 2010/0056170 A1 | 3/2010 | Lindoff |
| 2010/0057924 A1 | 3/2010 | Rauber et al. |
| 2010/0067422 A1 | 3/2010 | Kadous et al. |
| 2010/0215022 A1 | 8/2010 | Black et al. |
| 2011/0007680 A1 | 1/2011 | Kadous et al. |
| 2011/0007688 A1 | 1/2011 | Veeravalli et al. |
| 2011/0171955 A1 | 7/2011 | Acharya |
| 2011/0222423 A1 | 9/2011 | Spindola et al. |
| 2011/0256834 A1 | 10/2011 | Dayal et al. |
| 2011/0310858 A1 | 12/2011 | Tokgoz et al. |
| 2012/0002660 A1 | 1/2012 | Wan et al. |
| 2012/0069232 A1 | 3/2012 | Chui et al. |
| 2012/0077532 A1 | 3/2012 | Kadous |
| 2012/0106610 A1* | 5/2012 | Nogami ............. H04B 7/063 375/224 |
| 2012/0113906 A1 | 5/2012 | Kadous et al. |
| 2012/0127870 A1 | 5/2012 | Zhao et al. |
| 2012/0127923 A1 | 5/2012 | Zhao et al. |
| 2012/0140798 A1 | 6/2012 | Kadous et al. |
| 2012/0207145 A1 | 8/2012 | Han et al. |
| 2012/0213303 A1 | 8/2012 | Kadous et al. |
| 2013/0201959 A1 | 8/2013 | Guo et al. |
| 2013/0229990 A1 | 9/2013 | Fan et al. |
| 2013/0265889 A1 | 10/2013 | Buckley et al. |
| 2013/0286960 A1 | 10/2013 | Li et al. |
| 2013/0300358 A1 | 11/2013 | Kirby et al. |
| 2014/0029705 A1 | 1/2014 | Wu et al. |
| 2014/0038645 A1 | 2/2014 | Wu et al. |
| 2014/0056239 A1 | 2/2014 | Zhang et al. |
| 2014/0071841 A1 | 3/2014 | Hu |
| 2014/0071894 A1 | 3/2014 | Kairouz et al. |
| 2014/0079155 A1 | 3/2014 | Wang et al. |
| 2014/0112288 A1 | 4/2014 | Wei |
| 2014/0185699 A1 | 7/2014 | Zhang |
| 2014/0219117 A1 | 8/2014 | Meshkati et al. |
| 2014/0219243 A1 | 8/2014 | Meshkati et al. |
| 2014/0226519 A1 | 8/2014 | Nagata et al. |
| 2014/0247814 A1 | 9/2014 | Zhang et al. |
| 2014/0256340 A1 | 9/2014 | Prakash et al. |
| 2014/0269616 A1 | 9/2014 | Black |
| 2014/0273884 A1 | 9/2014 | Mantravadi et al. |
| 2014/0285684 A1 | 9/2014 | Huang et al. |
| 2014/0362744 A1 | 12/2014 | Yan et al. |
| 2015/0036658 A1* | 2/2015 | Mochizuki ............ H04W 48/16 370/331 |
| 2015/0063150 A1 | 3/2015 | Sadek et al. |
| 2015/0063151 A1 | 3/2015 | Sadek et al. |
| 2015/0063323 A1 | 3/2015 | Sadek et al. |
| 2015/0065152 A1 | 3/2015 | Sadek et al. |
| 2015/0070323 A1 | 3/2015 | Hong et al. |
| 2015/0071648 A1 | 3/2015 | Hong et al. |
| 2015/0085686 A1 | 3/2015 | Chande et al. |
| 2015/0098415 A1 | 4/2015 | Chen |
| 2015/0133184 A1 | 5/2015 | Sadek et al. |
| 2015/0139015 A1 | 5/2015 | Kadous et al. |
| 2015/0163823 A1 | 6/2015 | Sadek et al. |
| 2015/0181299 A1 | 6/2015 | Rauber et al. |
| 2015/0195733 A1 | 7/2015 | Yavuz et al. |
| 2015/0208263 A1* | 7/2015 | Behravan ............. H04L 5/0057 370/252 |
| 2015/0223077 A1 | 8/2015 | Fan et al. |
| 2015/0245273 A1 | 8/2015 | Grob et al. |
| 2015/0282077 A1 | 10/2015 | Yavuz et al. |
| 2015/0319702 A1 | 11/2015 | Patel et al. |
| 2015/0326382 A1 | 11/2015 | Li et al. |
| 2015/0350919 A1 | 12/2015 | Patel et al. |
| 2015/0382190 A1 | 12/2015 | Canoy et al. |
| 2016/0036571 A1 | 2/2016 | Park et al. |
| 2016/0088625 A1 | 3/2016 | Kadous et al. |
| 2016/0095039 A1 | 3/2016 | Valliappan et al. |
| 2016/0095040 A1 | 3/2016 | Valliappan et al. |
| 2016/0128130 A1 | 5/2016 | Sadek et al. |
| 2016/0157133 A1 | 6/2016 | Ehsan |
| 2016/0309452 A1* | 10/2016 | Chen .................. H04W 72/042 |
| 2016/0353482 A1 | 12/2016 | Valliappan et al. |
| 2017/0005741 A1 | 1/2017 | Wu et al. |
| 2017/0019814 A1 | 1/2017 | Determan et al. |
| 2017/0027017 A1 | 1/2017 | Black et al. |
| 2017/0048047 A1 | 2/2017 | Kadous et al. |
| 2017/0048819 A1 | 2/2017 | Mochizuki et al. |
| 2017/0048889 A1 | 2/2017 | Kadous et al. |
| 2017/0055260 A1 | 2/2017 | Valliappan et al. |
| 2017/0055285 A1 | 2/2017 | Valliappan et al. |
| 2017/0055291 A1 | 2/2017 | Gorokhov et al. |
| 2017/0064657 A1 | 3/2017 | Chendamarai et al. |
| 2017/0064729 A1 | 3/2017 | Sadek et al. |
| 2017/0093545 A1 | 3/2017 | Kadous et al. |
| 2017/0094680 A1 | 3/2017 | Patel et al. |
| 2017/0135029 A1 | 5/2017 | Chendamarai et al. |
| 2017/0142705 A1 | 5/2017 | Chendamarai et al. |
| 2017/0142713 A1 | 5/2017 | Chendamarai et al. |
| 2017/0202022 A1 | 7/2017 | Chendamarai et al. |
| 2017/0208576 A1 | 7/2017 | Chendamarai et al. |
| 2017/0222771 A1 | 8/2017 | Chendamarai et al. |
| 2017/0223651 A1 | 8/2017 | Patel et al. |
| 2017/0223737 A1 | 8/2017 | Patel et al. |
| 2017/0251473 A1 | 8/2017 | Xue et al. |
| 2017/0280382 A1 | 9/2017 | Radulescu et al. |
| 2017/0311316 A1 | 10/2017 | Chendamarai et al. |
| 2017/0311343 A1 | 10/2017 | Chendamarai et al. |
| 2017/0311346 A1 | 10/2017 | Chendamarai et al. |
| 2017/0318586 A1 | 11/2017 | Wang et al. |
| 2017/0332288 A1 | 11/2017 | Sadek et al. |
| 2017/0359263 A1 | 12/2017 | Barghi et al. |
| 2017/0359815 A1 | 12/2017 | Chendamarai et al. |
| 2018/0020470 A1* | 1/2018 | Zhuang ............ H04W 72/0446 |
| 2018/0034612 A1 | 2/2018 | Lin et al. |
| 2018/0042018 A1 | 2/2018 | Bhushan et al. |
| 2018/0054348 A1 | 2/2018 | Luo et al. |
| 2018/0054382 A1 | 2/2018 | Luo et al. |
| 2018/0054762 A1 | 2/2018 | Kadous et al. |
| 2018/0054780 A1 | 2/2018 | Radulescu et al. |
| 2018/0054783 A1 | 2/2018 | Luo et al. |
| 2018/0054811 A1 | 2/2018 | Luo et al. |
| 2018/0054812 A1 | 2/2018 | Luo et al. |
| 2018/0054830 A1 | 2/2018 | Luo et al. |
| 2018/0054832 A1 | 2/2018 | Luo et al. |
| 2018/0059221 A1 | 3/2018 | Slobodyanyuk et al. |
| 2018/0063799 A1 | 3/2018 | Sadek et al. |
| 2018/0069589 A1 | 3/2018 | Liu et al. |
| 2018/0070243 A1 | 3/2018 | Liu et al. |
| 2018/0084430 A1 | 3/2018 | Patel et al. |
| 2018/0098225 A1 | 4/2018 | Damnjanovic et al. |
| 2018/0098335 A1 | 4/2018 | Sun et al. |
| 2018/0103461 A1 | 4/2018 | Sun et al. |
| 2018/0103472 A1 | 4/2018 | Zhang et al. |
| 2018/0109957 A1 | 4/2018 | Fan et al. |
| 2018/0110022 A1 | 4/2018 | Fan et al. |
| 2018/0110063 A1 | 4/2018 | Fan et al. |
| 2018/0115907 A1 | 4/2018 | Damnjanovic et al. |
| 2018/0115933 A1 | 4/2018 | Radulescu et al. |
| 2018/0115973 A1 | 4/2018 | Black et al. |
| 2018/0123859 A1 | 5/2018 | Liu et al. |
| 2018/0124770 A1 | 5/2018 | Yerramalli et al. |
| 2018/0124776 A1 | 5/2018 | Yerramalli et al. |
| 2018/0124777 A1 | 5/2018 | Yerramalli et al. |

(56) References Cited

U.S. PATENT DOCUMENTS

| | | |
|---|---|---|
| 2018/0124789 A1 | 5/2018 | Yerramalli et al. |
| 2018/0124820 A1 | 5/2018 | Sun et al. |
| 2018/0132236 A1 | 5/2018 | Kadous |
| 2018/0139616 A1 | 5/2018 | Khoshnevisan et al. |
| 2018/0139618 A1 | 5/2018 | Yerramalli et al. |
| 2018/0139782 A1 | 5/2018 | Sadek et al. |
| 2018/0146480 A1 | 5/2018 | Chendamarai et al. |
| 2018/0160328 A1 | 6/2018 | Chendamarai et al. |
| 2018/0160389 A1 | 6/2018 | Yerramalli et al. |
| 2018/0167848 A1 | 6/2018 | Lei et al. |
| 2018/0167968 A1 | 6/2018 | Liu et al. |
| 2018/0175986 A1 | 6/2018 | Chendamarai et al. |
| 2018/0176946 A1 | 6/2018 | Sun et al. |
| 2018/0198518 A1 | 7/2018 | Wu et al. |
| 2018/0206113 A1 | 7/2018 | He et al. |
| 2018/0213560 A1 | 7/2018 | Naghshvar et al. |
| 2018/0220428 A1 | 8/2018 | Sun et al. |
| 2018/0227011 A1 | 8/2018 | Yerramalli et al. |
| 2018/0227771 A1 | 8/2018 | Malik et al. |
| 2018/0227797 A1 | 8/2018 | Liu et al. |
| 2018/0227936 A1 | 8/2018 | Yerramalli et al. |
| 2018/0227944 A1 | 8/2018 | Yerramalli et al. |
| 2018/0241494 A1 | 8/2018 | Chendamarai et al. |
| 2018/0241526 A1 | 8/2018 | Chendamarai et al. |
| 2018/0242163 A1 | 8/2018 | Patel et al. |
| 2018/0242223 A1 | 8/2018 | Chendamarai et al. |
| 2018/0242232 A1 | 8/2018 | Chendamarai et al. |
| 2018/0242277 A1 | 8/2018 | Liu et al. |
| 2018/0242348 A1 | 8/2018 | Chendamarai et al. |
| 2018/0249380 A1 | 8/2018 | Zhang et al. |
| 2018/0249496 A1 | 8/2018 | Radulescu et al. |
| 2018/0255561 A1 | 9/2018 | Barghi et al. |
| 2018/0255584 A1 | 9/2018 | Sun et al. |
| 2018/0269962 A1 | 9/2018 | Liu et al. |
| 2018/0278363 A1 | 9/2018 | Bhushan et al. |
| 2018/0279134 A1 | 9/2018 | Malik et al. |
| 2018/0279156 A1 | 9/2018 | Malik et al. |
| 2018/0279189 A1 | 9/2018 | Bergström et al. |
| 2018/0279212 A1 | 9/2018 | Malik et al. |
| 2018/0279292 A1 | 9/2018 | Luo et al. |
| 2018/0287762 A1 | 10/2018 | Sun et al. |
| 2018/0287840 A1 | 10/2018 | Akkarakaran et al. |
| 2018/0287870 A1 | 10/2018 | Yerramalli et al. |
| 2018/0288747 A1 | 10/2018 | Sun et al. |
| 2018/0288749 A1 | 10/2018 | Sun et al. |
| 2018/0288781 A1 | 10/2018 | Akkarakaran et al. |
| 2018/0294911 A1 | 10/2018 | Sun et al. |
| 2018/0295622 A1 | 10/2018 | Sadek et al. |
| 2018/0302186 A1 | 10/2018 | Reddy et al. |
| 2018/0302201 A1 | 10/2018 | Yoo et al. |
| 2018/0302796 A1 | 10/2018 | Zhang et al. |
| 2018/0309479 A1 | 10/2018 | Yerramalli et al. |
| 2018/0310267 A1 | 10/2018 | Liu et al. |
| 2018/0310341 A1 | 10/2018 | Yerramalli et al. |
| 2018/0317093 A1 | 11/2018 | Li et al. |
| 2018/0317259 A1 | 11/2018 | Islam et al. |
| 2018/0324713 A1 | 11/2018 | Yoo et al. |
| 2018/0331870 A1 | 11/2018 | Sun et al. |
| 2018/0332551 A1 | 11/2018 | Liu et al. |
| 2018/0338299 A1 | 11/2018 | Liu et al. |
| 2018/0343156 A1 | 11/2018 | Malik et al. |
| 2018/0343588 A1 | 11/2018 | Sadek et al. |
| 2018/0343676 A1 | 11/2018 | Yerramalli et al. |
| 2018/0352563 A1 | 12/2018 | Liu |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0281440 A1 | 9/2019 | Ly et al. |
| 2019/0296873 A1* | 9/2019 | Gupta .................. H04B 7/024 |
| 2020/0145128 A1 | 5/2020 | Black et al. |
| 2020/0145154 A1 | 5/2020 | Black et al. |

OTHER PUBLICATIONS

3GPP TR 36.741, Study on Further Enhancements to Coordinated Multi-Point (CoMP) Operation for LTE, V14.0.0, Mar. 2017.

Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.

Andrews, et al., Are We Approaching the Fundamental Limits of Wireless Network Densification?, IEEE Communications Magazine, vol. 54, No. 10, pp. 184-190, Oct. 2016.

Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—a Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

Gesbert, et al., Multi-cell MIMO Cooperative Networks: A New Look at Interference, IEEE Journal on Selected Areas in Communications, vol. 28, No. 9, pp. 1380-1408, Dec. 2010.

Gilhousen, et al., On the Capacity of a Cellular CDMA system, IEEE Transactions on Vehicular Technology, vol. 40, No. 2, pp. 303-311, May 1991.

Interdonato, et al., How Much Do Downlink Pilots Improve Cell-Free Massive MIMO?, IEEE, 2016, 7 pages.

Larsson, et al., Massive MIMO for Next Generation Wireless Systems, Jan. 2014.

Marzetta, et al., Fundamentals of Massive MIMO, Cambridge University Press, Dec. 2016, Table of Contents.

Nayebi, et al., Precoding and Power Optimization in Cell-Free Massive MIMO Systems, IEEE Transactions on Wireless Communications, vol. 16, No. 7, pp. 4445-4459, Jul. 2017.

(56) References Cited

OTHER PUBLICATIONS

Ngo, et al., Cell-Free Massive MIMO Versus Small Cells, IEEE Transactions on Wireless Communications, vol. 16, No. 3, pp. 1834-1850, Mar. 2017.

Ngo, et al., On the Total Energy Efficiency of Cell-Free Massive MIMO, IEEE Transactions on Green Communications and Networking, vol. 2, No. 1, pp. 25-39, Mar. 2018.

Osseiran, et al., 5G Mobile and Wireless Communications Technology, Cambridge University Press, Oct. 2016, Ch. 9, Coordinated multi-point transmission in 5G.

Rohde & Schwarz, LTE Transmission Modes and Beamforming, White Paper, Jul. 2015.

Shamai, et al., Enhancing the Cellular Downlink Capacity via Co-processing at the Transmitting End, Proceedings of IEEE VTC—Spring, vol. 3, 2001, pp. 1745-1749.

Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.

Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.

Wu, et al., Cloud Radio Access Network (C-RAN): A Primer, IEEE Network, vol. 29, No. 1, pp. 35-41, Jan./Feb. 2015.

Wu, et al., Centralized and Distributed Schedulers for Non-Coherent Joint Transmission, Sep. 2018.

Zhou, et al., Distributed Wireless Communication System: A New Architecture for Future Public Wireless Access, IEEE Communications Magazine, vol. 41, No. 3, pp. 108-113, Mar. 2003.

International Search Report for International Application No. PCT/US2019/059196 dated Feb. 25, 2020 in 3 pages.

Written Opinion for International Application No. PCT/US2019/059196 dated Feb. 25, 2020 in 8 pages.

3GPP TR-36.819 V11.1.0, 3rd Generation Partnership Project; Technical Specification Group Radio Access Network; Coordinated multi-point operation for LTE physical layer aspects (Release 11), Dec. 2011.

\* cited by examiner

USER EQUIPMENT ASSISTED MULTIPLE-INPUT MULTIPLE-OUTPUT DOWNLINK CONFIGURATION

CROSS REFERENCE TO PRIORITY APPLICATION

This application is a continuation of U.S. patent application Ser. No. 16/180,869, filed Nov. 5, 2018 and titled "USER EQUIPMENT ASSISTED MULTIPLE-INPUT MULTIPLE-OUTPUT DOWNLINK CONFIGURATION," the disclosure of which is hereby incorporated by reference herein in its entirety and for all purposes.

BACKGROUND

Technical Field

Embodiments of this disclosure relate to wireless communication systems such as heterogeneous multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

BRIEF DESCRIPTION OF THE DRAWINGS

Embodiments of this disclosure will now be described, by way of non-limiting example, with reference to the accompanying drawings.

SUMMARY OF CERTAIN INVENTIVE ASPECTS

Figure 1:
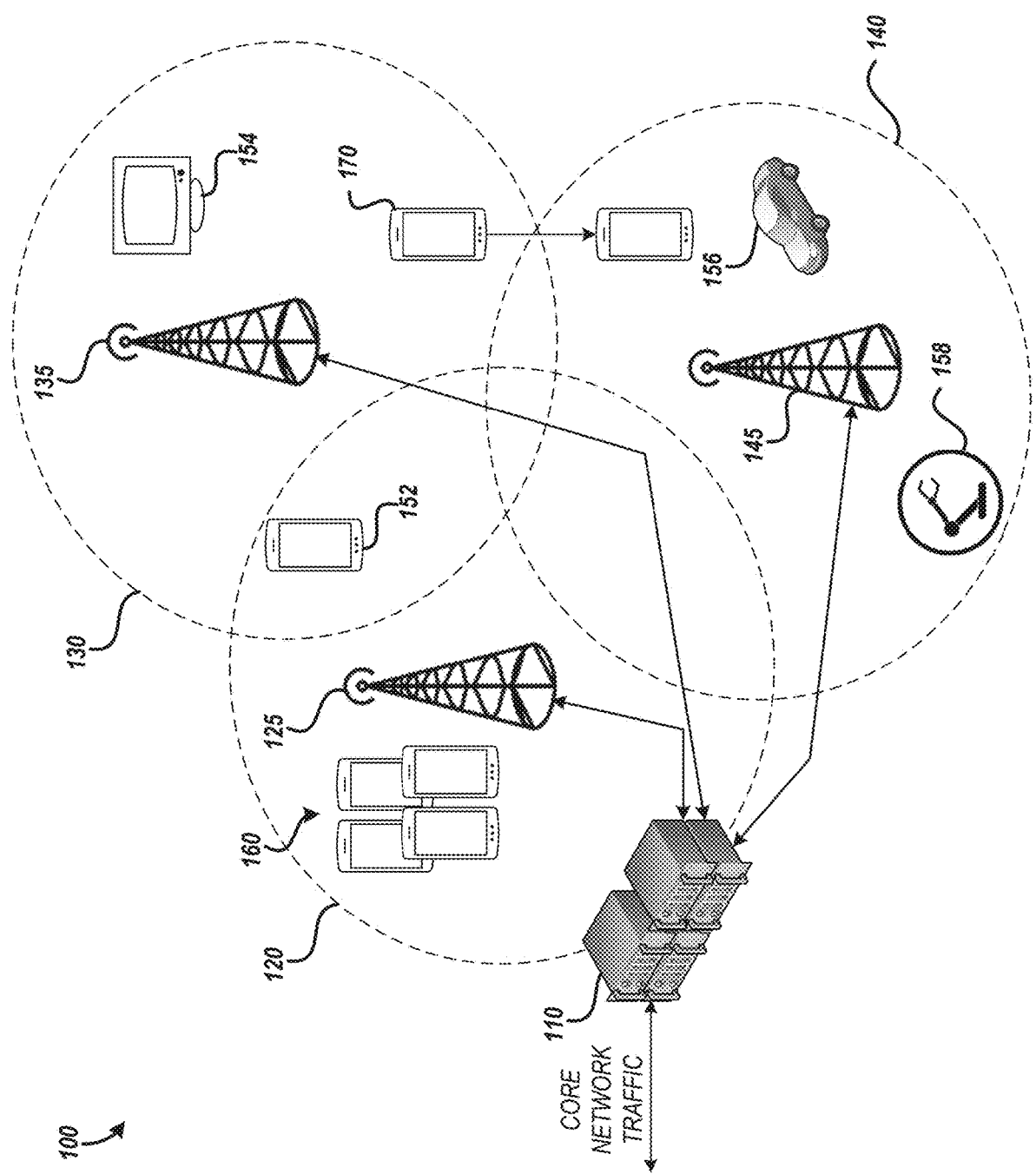
FIG. 1 is a diagram illustrating a heterogeneous multiple-input multiple-output (MIMO) network in which user equipment (UE) and a network system wirelessly communicate according to an embodiment.

The innovations described in the claims each have several aspects, no single one of which is solely responsible for its desirable attributes. Without limiting the scope of the claims, some prominent features of this disclosure will now be briefly described.

One aspect of this disclosure is a network system that includes antenna elements and a scheduler in communication with the antenna elements. The scheduler is configured to receive, via at least one antenna element included in the antenna elements, channel state information for a user equipment. The channel state information identifies a quality of a transmission from one or more of the antenna elements to the user equipment. The scheduler is configured to determine a downlink data transmission mode to the user equipment based at least in part on the channel state information and additional network system information. The scheduler is configured to cause transmission of active set data to the user equipment. The active set data identifies one or more serving nodes to provide a wireless downlink transmission service to the user equipment in the downlink data transmission mode.

Another aspect of this disclosure is a method controlling a downlink data transmission mode for a user equipment. The method includes receiving, via at least one antenna element included in the antenna elements, channel state information for a user equipment. The channel state information identifies a quality of a transmission from one or more of the antenna elements to the user equipment. The method includes determining a downlink data transmission mode to the user equipment based at least in part on the channel state information and additional network system information. The method also includes causing transmission of active set data to the user equipment. The active set data identifies one or more serving nodes to provide a wireless downlink transmission service to the user equipment in the downlink data transmission mode.

Another aspect of this disclosure is a network system for downlink data transmission in multiple-modes. The network system includes a scheduler and a transmitter in communication with the scheduler. The scheduler is configured to schedule a first downlink data transmission to a user equipment in a coordinated multi-point mode and to schedule a second downlink data transmission to the user equipment in an alternative downlink data mode. The transmitter is configured to output first data associated with the first downlink data transmission for transmission to the user equipment in the coordinated multi-point mode and to output second data associated with the second downlink data transmission for transmission to the user equipment in the alternative downlink data mode.

Another aspect of this disclosure is a user equipment that includes antenna elements, a receiver configured to process a signal received by the antenna elements, and a processor. The processor is configured to receive, from the receiver, first active set data identifying one or more serving nodes to provide downlink data transmission service to the user equipment in a coordinated multipoint mode. The processor is configured to detect a characteristic of the user equipment. The characteristic comprises at least one of: an application type to utilize the downlink data transmission service, a protocol to utilize over the downlink data transmission service, or a device type for the user equipment. The processor is configured to cause transmission, via at least one of the antenna elements, of channel state information for the user equipment and the characteristic. The channel state information identifies a quality of a transmission from a network system to the user equipment. The processor is configured to receive, from the receiver via at least one of the antenna elements, updated active set data identifying one or more serving nodes to provide transmission service to the user equipment in an alternate downlink data transmission mode. The alternate downlink data transmission mode includes at least one of synchronized transmission across multiple network nodes for coherent combining, transmissions across multiple network nodes for non-coherent combining, or individual transmission from a selected best serving node. The processor is configured to cause the receiver to be adjusted for processing the signal in the alternative downlink data transmission mode from the one or more serving nodes identified by the updated active set data Another aspect of this disclosure is a method of downlink transmission control for a user equipment. The method includes receiving, from a receiver of a user equipment, a first active set data identifying one or more serving nodes to provide downlink data transmission service to the user equipment in a coordinated multipoint mode. The method also includes detecting a characteristic of the user equipment. The characteristic comprises at least one of: an application type to utilize the downlink data transmission service, a protocol to utilize over the downlink data transmission service, or a device type for the user equipment. The method includes causing transmission, via at least one of a plurality of antenna elements of channel state information for the user equipment and the characteristic of the user equipment. The channel state information identifies a quality of a transmission from a network system to the user equipment. The method further includes receiving, from the receiver via at least one of the antenna elements, updated active set data identifying one or more serving nodes to provide the downlink data transmission service to the user equipment in an alternate downlink data transmission mode. The alternate downlink data transmission mode includes at least one of synchronized transmission across multiple network nodes for coherent combining, transmissions across multiple network nodes for non-coherent combining, or individual transmission from a selected best serving node.

Another aspect of this disclosure is a user equipment that includes antenna elements and a processor. The antenna elements include a first antenna element. The processor is configured to receive, from a base station, information identifying an active set of one or more serving nodes to provide transmission service to the user equipment. The processor is configured to determine a selected mode of wirelessly receiving data using the first antenna element. The selected mode is either a coordinated multipoint mode or an alternate downlink data transmission mode. The processor is configured to cause transmission, via at least one of the antenna elements, of a request to receive data at the first antenna element in the selected mode.

Another aspect of this disclosure is a method of requesting a selected communication mode. The method includes receiving, from a base station and with a processor of a user equipment, an active set of one or more serving nodes to provide transmission service to the user equipment. The method includes determining, using the processor of the user equipment, a selected mode of wirelessly receiving data using a first antenna element of the user equipment. The selected mode is either a coordinated multipoint mode or an alternate downlink data transmission mode. The method also includes wirelessly transmitting a request to receive data at the antenna element in the selected mode.

Another aspect of this disclosure is a network system that includes antenna elements and a scheduler in communication with the antenna elements. The scheduler is configured to receive, via at least one antenna element included in the antenna elements, a request from a user equipment to wirelessly receive data in a particular mode, in which the particular mode is either a coordinated multipoint mode or an alternate downlink data transmission mode. The scheduler is configured to determine a downlink data transmission mode to the user equipment and active set data based on the request and additional network system information. The active set data identifies one or more serving nodes to provide a wireless downlink transmission service to the user equipment via the downlink data transmission mode. The scheduler is configured to cause transmission of active set data to the user equipment.

Yet another aspect of this disclosure is a method of determining and implementing a downlink traffic mode to a user equipment. The method includes receiving, via at least one antenna element, a request from a user equipment to wirelessly receive data in a particular mode, in which the particular mode is either a coordinated multipoint mode or an alternate downlink data transmission mode. The method includes determining a downlink data transmission mode for wirelessly transmitting data to the user equipment and active set data based on the request and additional network system information. The active set data identifies one or more serving nodes to provide a wireless downlink transmission service to the user equipment via the downlink data transmission mode. The method also includes transmitting active set data to the user equipment.

The present disclosure relates to U.S. patent application Ser. No. 16/180,848, titled "COOPERATIVE MULTIPLE-INPUT MULTIPLE-OUTPUT DOWNLINK SCHEDULING," U.S. patent application Ser. No. 16/180,799, titled "VARIABLE MULTIPLE-INPUT MULTIPLE-OUTPUT DOWNLINK USER EQUIPMENT," and U.S. patent application Ser. No. 16/180,947, titled "DISTRIBUTED MULTIPLE-INPUT MULTIPLE-OUTPUT DOWNLINK CONFIGURATION," each filed on Nov. 5, 2018 and the disclosures of each of which are hereby incorporated by reference in their entireties herein.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

DETAILED DESCRIPTION OF CERTAIN EMBODIMENTS

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

A distributed coordinated multiple-input multiple-output (MIMO) network that is designed to provide high uniform data rates across the network can face a number of significant challenges. Such challenges can include servicing devices in mobility and/or providing reliable data service in the case of poor channel conditioning, such as when most of the devices are clustered around a few antenna nodes. Technology disclosed herein can enable high data rate and high reliability for devices across Doppler and different channel conditions in a distributed MIMO network, thereby extending the benefits of distributed MIMO to larger set of devices reliably across the network. Such a network can provide low latency and high throughput with low jitter. Efficient quality of service at high user density can also be achieved with such a network. Highly robust connections can enable mobile edge computing.

In addition, there can be challenges with scalability across a wide area network and/or complexity of implementing a distributed MIMO network at scale. Technology disclosed herein can scale across a wide area network without significantly adding to complexity at scale.

Aspects of this disclosure relate to a unified coordinated MIMO network across multiple transmit-receive points (TRPs) to serve devices in different channel conditions. Available network resources can be dynamically partitioned to be used between coordinated multi-point (CoMP) operation and an alternative downlink data transmission mode of operation (e.g., single-frequency network (SFN), non-coherent combining (soft handoff), best server selection SIMO (single-input multiple-output), best server selection single user MIMO (SU-MIMO), best server selection multi-user MIMO (MU-MIMO), etc.). Accordingly, a unified framework for operating in CoMP or the alternative downlink data transmission mode of operation is provided. The network and UE (user equipment) can use a criterion based on a set of metrics to determine the best operating regime to serve a given antenna and/or device for downlink data transmission. The metrics can include a device mobility state, a Doppler estimate, a measure of the network-to-UE channel matrix condition such as Eigen-value spread, a network congestion measure (e.g., network load), the like, or any suitable combination thereof. The UEs in mobility or with an ill-conditioned channel matrix can operate in the alternative downlink data transmission mode for reliability, whereas other UEs can be served with CoMP to increase and/or maximize overall system capacity.

The technology disclosed herein relates to a wireless communication system with resources to operate in both CoMP mode and at least one alternative downlink data transmission mode. Moreover, the technology described herein provides a mechanism that enables the network to select the best mode of operation from between CoMP mode and at least one alternative downlink data transmission mode. User equipment can request to receive data in either CoMP mode or the alternative downlink data transmission mode. The wireless systems disclosed herein can enable robust, consistently high data rate, ultra-low latency wireless connection within a dense network. The wireless systems disclosed herein are applicable to user equipment with a variety of mobility and/or link conditions.

The network and UEs may collect a set of monitoring metrics, which can include one or more of a channel matrix condition for each UE via measuring Eigen spread, UE mobility via Doppler estimation, network load via scheduling metrics, and measure of UE channel state information (CSI), or throughput over time. The channel state information may identify a quality of a transmission from one or more antenna elements (e.g., a MIMO antenna array) to the user equipment. The network can make a determination of the best downlink data transmission mode to a particular UE based on the metrics. The network can serve a UE in CoMP mode when conditions are suitable for CoMP mode. However, the network can serve the UE in the alternative downlink data transmission mode in response to detecting a condition indicating that CoMP mode is undesirable. For example, for a UE with a Doppler estimation exceeding a threshold or the channel Eigen spread larger than another threshold, the network can serve the UE in the alternative downlink data transmission mode. As another example, if the network is overly congested in CoMP mode, UEs with less favorable channel conditions can be served in the alternative downlink data transmission mode.

Technology disclosed herein can use UE channel conditions to significantly improve the robustness of a coordinated MIMO network to ensure reliability in serving the users in adverse channel conditions while achieving high data capacity across the network for low mobility users. The technology disclosed herein provides a comprehensive consideration of operation regimes and the flexibility to choose the best one for a particular set of conditions.

Heterogeneous MIMO Network

FIG. 1 is a diagram illustrating a heterogeneous multiple-input multiple-output (MIMO) network in which user equipment (UE) and a network system wirelessly communicate according to an embodiment. The heterogeneous MIMO network can implement a downlink coordinated joint transmission and/or reception across distributed antennas in a coordinated multipoint (CoMP) mode. The heterogeneous MIMO network can also implement a macro diversity mode for wirelessly communicating between UEs and the network system. The network system can partition system resources between the different modes of operation. For example, carriers in the frequency domain can be used to partition resources between the different modes of operation. Alternatively or additionally, time slots can be used to partition resources between the different modes of operation in the time domain.

The heterogeneous MIMO network provides a unified approach to serve low mobility and high mobility UEs. In addition, the heterogeneous MIMO network can implement robust processing to handle singularities. The heterogeneous MIMO network an address diverse channel conditions to provide spectrally efficient service. Network system spectral efficiency can be increased by dynamic load balancing.

FIG. 1 shows an example environment for distributed MIMO wireless communications. Various standards and protocols may be included in the environment 100 to wirelessly communicate data between a base station and a wireless communication device. Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base station associated with one or more evolved Node Bs (also commonly denoted as enhanced Node Bs, eNodeBs, or eNBs, gNBs, or any other suitable Node Bs (xNBs)). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). A downlink (DL) transmission generally refers to a communication from the base transceiver station (BTS) or eNodeB to the wireless communication device, and an uplink (UL) transmission generally refers to a communication from the wireless communication device to the BTS.

FIG. 1 illustrates a cooperative, or cloud radio access network (C-RAN) environment 100. In the environment 100, the eNodeB functionality is subdivided between a base band unit (BBU) 110 and multiple remote radio units (RRUs) (e.g., RRU 125, RRU 135, and RRU 145). An RRU may include multiple antennas, and one or more of the antennas may serve as a transmit-receive point (TRP). The RRU and/or a TRP may be referred to as a serving node. The BBU 110 may be physically connected to the RRUs such as via an optical fiber connection. The BBU 110 may provide operational details to an RRU to control transmission and reception of signals from the RRU along with control data and payload data to transmit. The RRU may provide data to the network received from UEs within a service area associated with the RRU. As shown in FIG. 1, the RRU 125 provides service to devices with a service area 120. The RRU 135 provides service to devices within a service area 130. The RRU 145 provides service to devices within a service area 140. For example, wireless downlink transmission service may be provided to the service area 140 to communicate date to one or more devices within the service area 140.

The RRUs may include multiple antennas to provide multiple in multiple out (MIMO) communications. For example, an RRU may be equipped with various numbers of transmit antennas (e.g., 1, 2, 4, 8, or more) that can be used simultaneously for transmission to one or more receivers, such as a user equipment (UE). Receiving devices may include more than one receive antenna (e.g., 2, 4, etc.). The array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit or receive according to a specific time, frequency, power, and direction configuration. The configuration may be provided by the BBU 110. The direction configuration may be generated based on network estimate using channel reciprocity or determined based on feedback from UE via selection of a beamforming codebook index, or a hybrid of the two.

The service areas shown in FIG. 1 may provide communication services to a heterogeneous population of user equipment. For example, the service area 120 may include a cluster of UEs 160 such as a group of devices associated with users attending a large public event. A mobile user equipment 170 may move from the service area 130 to the service area 140. Another example of a mobile user equipment is a vehicle 156 which may include a transceiver for wireless communications for real-time navigation, on-board data services (e.g., streaming video or audio), or other data applications. The environment 100 may include semi-mobile or stationary devices such as robotic device 158 (e.g., robotic arm, autonomous drive unit, or other industrial or commercial robot), or a television 154 also configured for wireless communications.

A user equipment 152 may be located with an area with overlapping service (e.g., the service area 120 and the service area 130). Each device in the environment 100 may have different performance needs which may, in some instances, conflict with the needs of other devices.

Figure 2:
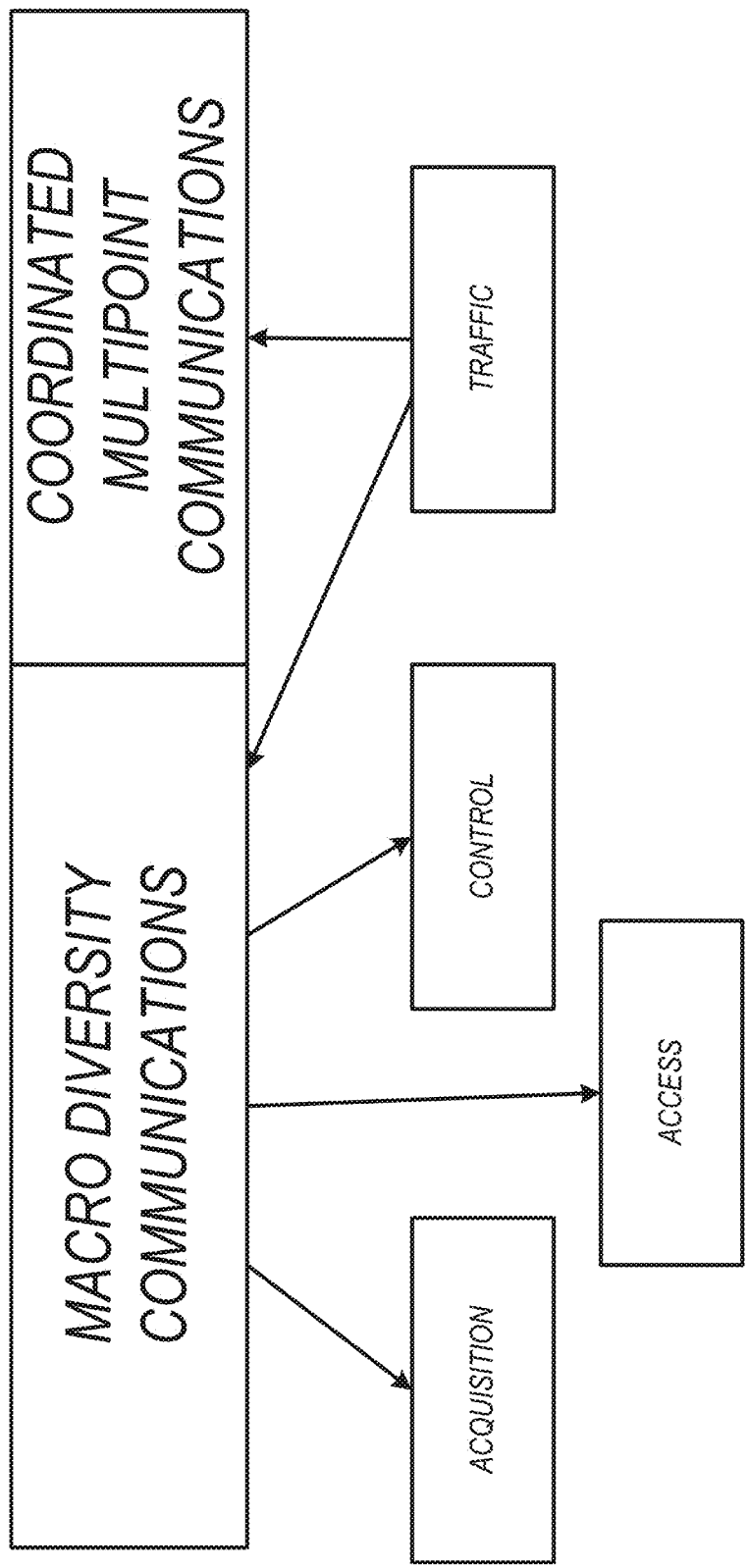
FIG. 2 is a logical diagram illustrating which types of wireless communications can be provided in which modes of operation in heterogeneous MIMO networks.

FIG. 2 is a logical diagram illustrating which types of wireless communications can be provided in which modes of operation in heterogeneous MIMO networks. Macro diversity communications may be allocated for messages related to acquiring service, requesting access to the service, and control messages for the service. Data traffic may be communicated using either macro diversity communication mode or coordinated multipoint mode for data traffic. Accordingly, the macro diversity mode is an alternative downlink data transmission mode. The alternative downlink data mode can be the mode in which acquisition, access, and control communications are communicated. The macro diversity mode or the coordinated multipoint mode can be selected based on any suitable criteria disclosed herein.

Figure 3:
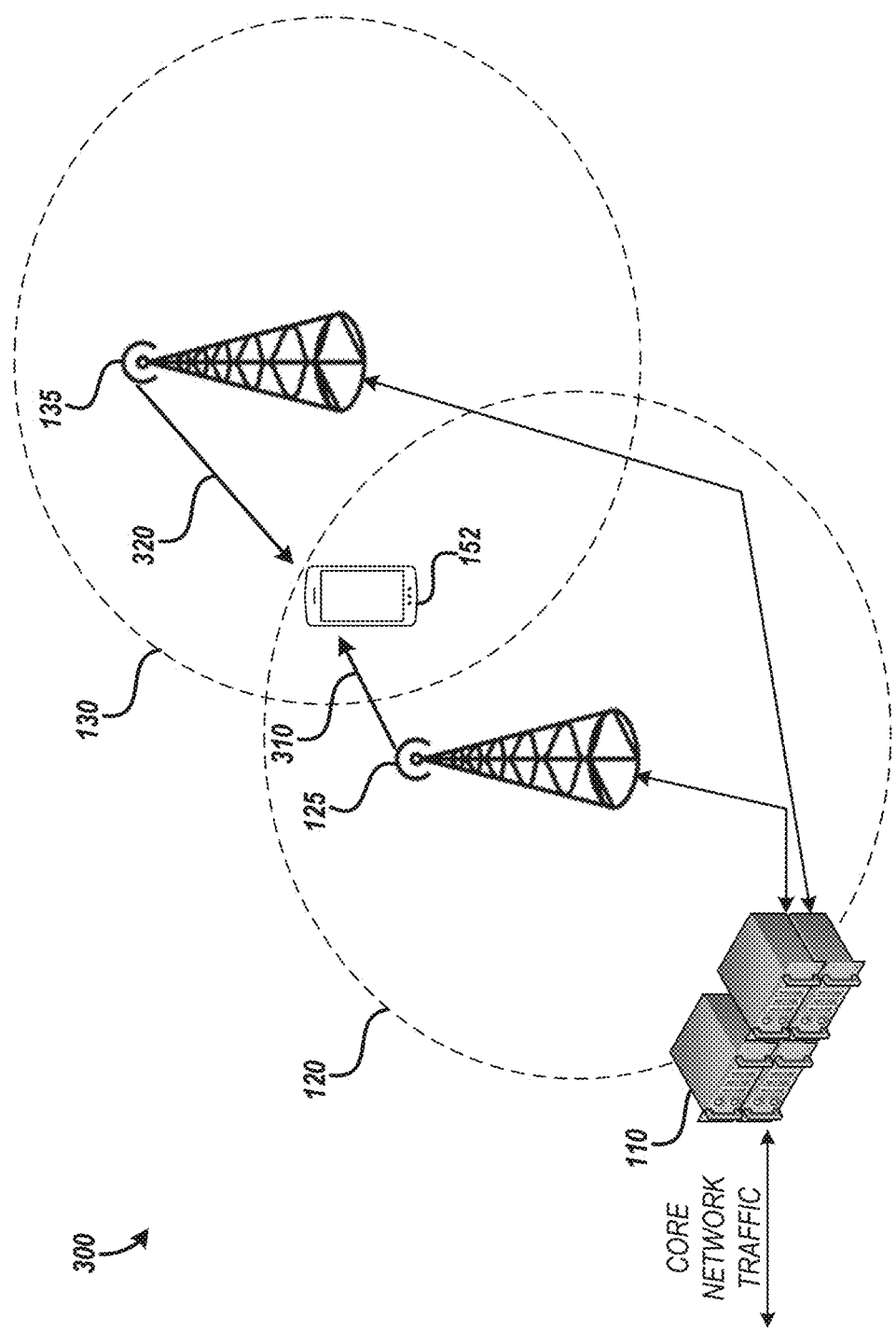
FIG. 3 is a diagram illustrating an example environment for coordinated multipoint communications for a UE.

FIG. 3 is a diagram illustrating an example environment for coordinated multipoint communications for a UE. In the environment 300, the UE 152 may receive downlink data traffic from the RRU 125 and the RRU 135 with each RRU sending one or more spatial layers via respective TRPs included in the RRU. Each spatial layer can correspond to a beam. The spatial layers may be coordinated such as by using a weighted combination for each layer to provide transmissions to a specific UE. Different sets of weighted combinations can be provided for different UEs. The transmissions from the RRU 125 and the RRU 135 may be coordinated by the base band unit 110. Coordination may include coordinating the timing of transmissions and data included in transmissions for the UE 152. The RRU 125 may use a first channel 310 to transmit data to the UE 152 while the RRU 135 may use a second channel 320 to transmit data to the UE 152 where the first and second channel are the same for CoMP.

Figure 4:
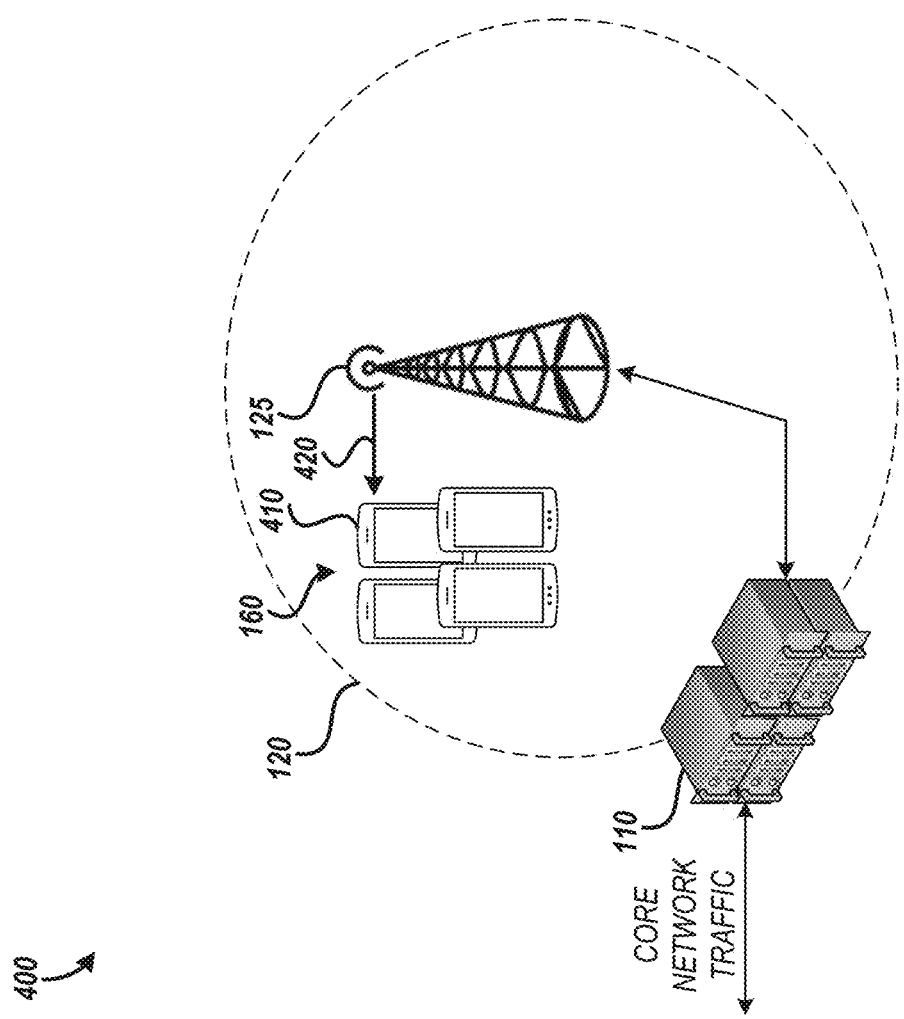
FIG. 4 is a diagram illustrating an example environment including macro diversity communications for a UE.

FIG. 4 is a diagram illustrating an example environment including macro diversity communications for a UE. In the environment 400, a UE 410 may receive data traffic over a channel 420 from the RRU 125. The RRU 125 may be selected by the BBU 110 as the best serving node for the UE 410. The evaluation may be based on signal strength, channel state information (CSI) reports received from the UE 410, mobility of the UE 410, spatial channel condition of a channel for the UE 410, or other factors of the environment 400 detectable by the BBU 110. In some implementations, the UE 410 may request the serving node. The UE 410 may identify the RRU 125 based on signal strength, anticipated data to be transmitted to or from the UE 410, or a control message received from the BBU 110. Another example of a macro diversity communication mode is individual network node transmissions from a selected node.

A further example of a macro diversity communication mode is synchronized transmissions across multiple RRU that are coherently combined by the UE 410. In this mode, each RRU may transmit downlink data traffic and the UE 410 may decode portions of different transmissions to assemble the data. The decoding may be based on transmission information (e.g., coefficients) shared between the transmitting RRU and the UE 410. Another example of a macro diversity communication mode is non-coherent combination of transmissions from multiple RRUs. In non-coherent systems, the UE 410 may decode received transmissions based on statistical information (e.g., coefficients) derived from received signal characteristics from one or more RRU's, not necessarily time aligned, and combine the received data as part of the demodulation process or combine post decode. In CoMP mode, different TRPs transmit different spatial layers (e.g., different data) to one or more UEs. In a macro diversity mode, the transmission may be sent from either one TRP or the same data across multiple TRPs.

Existing systems are configured to use one communication mode, system-wide, for the downlink data traffic. By using only one downlink data traffic mode, systems may provide suboptimal service to at least some of the devices served. For example, in cases where a service area includes a high density of UEs concentrated near one of the many RRUs in the area, the beamforming and other transmission coordination needed to provide a high quality service to all UEs in the dense area may cause a substantial downgrade in the communication rate within a service area utilizing coordinated multipoint methods. Similarly, in cases where a UE is moving rapidly, CoMP methods may incur substantial overhead to provide service to the moving UE.

To indicate the downlink data traffic mode, the BBU 110 may communicate one or more identifiers to a UE. The identifiers indicate the RRUs providing downlink data traffic to the UE. The set of identifiers may be referred to as an active set for the UE. In a macro diversity mode, the active set may include the identifier of a single RRU or a group of RRUs transmitting the same data to the UE for soft-combining (SFN) or non-coherent combining (soft handoff). In a coordinated multipoint mode, the active set may include the identifiers of the RRUs coordinating to provide one or more spatial layers of downlink data traffic to the UE.

As described in further detail below, the BBU 110 may dynamically assess characteristics of the network or the UE to determine which mode to use for downlink data traffic for a UE. This allows the BBU 110 to selectively communicate with UEs based on network conditions or operational needs of the UE. This also allows the BBU 110 to allocate transmission resources in consideration of overall network impact rather than treating each UE as an independent assignment that has no impact on the traffic mode assigned for other devices.

The environment 100 shown in FIG. 1 may represent a portion of a larger environment including additional or alternative base band units coupled with additional or alternative remote radio units.

Mode Determination

A downlink data transmission mode can be dynamically determined in a heterogeneous MIMO network. As discussed above, the downlink data transmission mode can be either a CoMP mode or an alternative downlink data transmission mode. The alternative downlink data transmission mode can be any of the macro diversity modes disclosed herein. The alternative downlink data transmission mode can be the mode in which acquisition, access, and control communications are communicated. A network scheduler can determine the downlink data transmission mode from a base station to a UE and/or to one or more particular antennas of a UE. The downlink data transmission mode can be selected based on a network centric determination or a UE assisted determination. The network centric determination can be based on a UE report and system load data. The UE assisted determination can be based on a request to receive downlink transmission data in a selected mode by a UE. More details regarding technical features of network centric mode determination and UE assisted mode determination are provided herein.

The desired mode of operation can be selected by a scheduler based on any suitable information. One or more of the following types of information can be used in determining a downlink data transmission mode: UE link quality, UE mobility data, a network to UE channel matrix condition, or network loading. Mobility data, such as Doppler estimation and/or channel state information (CSI) variation, can be used in determining the desired mode. With more mobility, CoMP mode can be more difficult and/or less effective. For instance, when a mobile phone is being used on a fast moving train, CoMP can be difficult due to poor channel estimates as a result of, for example, the fast changing channel conditions and an alternative downlink data transmission mode can be selected. A network to UE channel matrix condition, such as a CSI estimation, can be used in determining the desired mode. The alternative downlink data transmission mode can be used when a network to UE channel matrix is undesirable and/or unsuitable for CoMP. Network loading data can be used to generate interference data in a base station. Such network loading data can be used by a scheduler to determine the selected mode of operation. As an example, a scheduler can select the alternative downlink data transmission mode in response to the network data indicating a relatively high load on CoMP resources.

The scheduler can select a mode of downlink data transmission from one or more serving nodes to a user equipment. The network scheduler can select CoMP as the selected mode in response to determining that conditions are suitable for CoMP. Otherwise, the network scheduler can select the alternative downlink data transmission mode as the desired mode.

The scheduler can select CoMP as the selected mode in response to determining that mobility is less than a threshold. The mobility can be determined by a mobility measure of a UE, such as CSI or a Doppler estimate. Alternatively or additionally, the scheduler can select CoMP as the selected mode in response to determining that the difference between maximum and mean Eigen-values of a downlink channel matrix is less than a threshold. For example, the scheduler can select CoMP as the selected mode in response to determining that (1) mobility is less than a first threshold, (2) the difference between maximum and mean Eigen-values of a downlink channel matrix are less than a second threshold, (3) an estimated relative spectral efficiency for serving CoMP mode to the UE is higher than for the alternative downlink data transmission mode, or (4) any suitable combination of (1) to (3). For example, the CoMP mode can be selected by (1), (2) and (3). As another example, CoMP mode can be selected by any two of (1), (2), or (3). In some instances, CoMP mode can be selected by any one of (1), (2), or (3). The first threshold and/or the second threshold can be adjustable based on one or more characteristics associated with a UE. The one or more characteristics of the UE can include a device type, a software program running on a UE, a protocol, a use case, the like, or any suitable combination thereof.

The scheduler can select the alternative downlink data transmission mode as the selected mode in response to determining that a condition indicates that CoMP mode is undesirable. Such a condition can include one or more of mobility being sufficiently high, a relatively low Eigen spread of a downlink channel matrix for a UE, or a sufficiently high load is detected on CoMP resources. Accordingly, the scheduler can select the alternative downlink data transmission mode as the selected mode in response to determining that (1) mobility is sufficiently high or (2) there is a relatively low Eigen spread of a downlink channel matrix for a UE or (3) there is a sufficiently high load is detected on CoMP resources or (4) an estimated relative spectral efficiency for serving the alternative downlink data mode to the UE is higher than for the CoMP mode. Mobility can be sufficiently high when mobility exceeds the first threshold. The load on CoMP resources can be based on detecting interference and/or a relatively large number of UEs in proximity to each other. A sufficiently high load on CoMP resources can involve the number of UEs being significantly greater than the number of distributed antennas of a heterogeneous MIMO network.

The scheduler may be implemented as a discrete hardware device. The scheduler may include one or more communication ports to transmit and/or receive messages via a network. For example, the scheduler may be communicatively coupled with a BBU to provide at least a portion of the scheduling features described. In some implementations, the scheduler may be integrated within a BBU. The scheduler may be implemented using specifically configured circuitry to provide at least a portion of the scheduling features described. In some implementations, the scheduler may include a processor configured by specific instructions stored in a non-transitory data store. When the processor executes the specific instructions, it may cause the scheduler to perform at least a portion of the scheduling features described.

Figure 5:
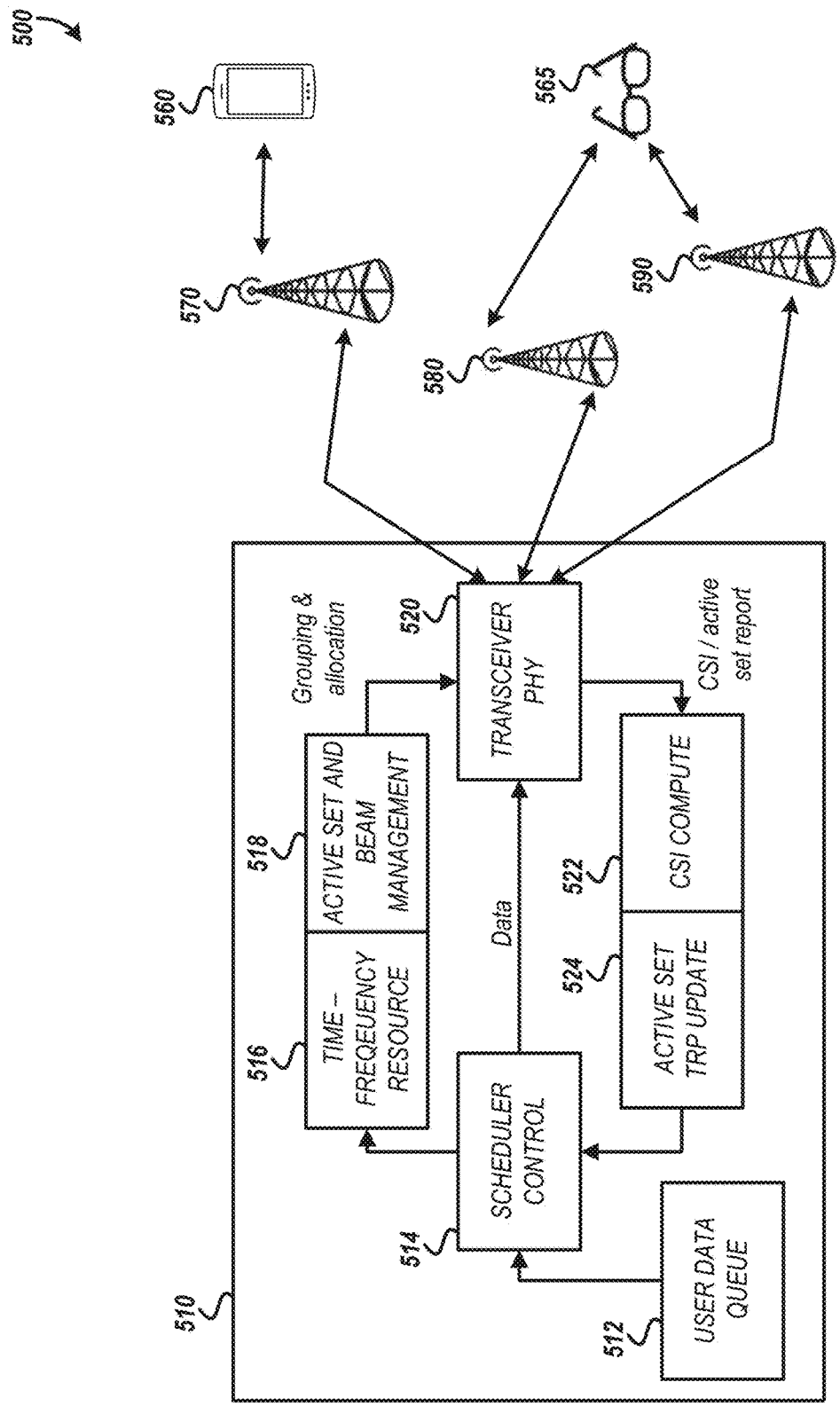
FIG. 5 is a schematic diagram illustrating a scheduler of a network system in a heterogeneous MIMO wireless network according to an embodiment.

FIG. 5 is a schematic diagram illustrating a heterogeneous MIMO wireless network 500 that includes a baseband unit 510 according to an embodiment. As illustrated, the baseband unit 510 includes a user data queue block 512, a scheduler control 514, a time/frequency resource allocation block 516, an active set and beam management block 518, a transceiver 520, a CSI computation block 522, and an active set serving node update block 524. The baseband unit 510 can include any suitable physical hardware to implement the illustrated blocks. For example, the baseband unit 510 can include a processor and computer readable storage to implement any suitable blocks shown in FIG. 5. The heterogeneous MIMO wireless network 500 also includes user equipment 560 and 565 and serving nodes 570, 580, and 590.

The baseband unit 510 includes a scheduler that schedules user data for wireless transmission from serving nodes 570, 580, and 590 to user equipment 560 and 565. The scheduler can schedule downlink data traffic in both the CoMP mode and the alternative downlink data transmission mode. For example, the scheduler can schedule downlink data traffic to one UE in the CoMP mode and to another UE in the alternative downlink data. As another example, the scheduler can schedule downlink data traffic to a UE in the CoMP mode at a first time and to the UE in the alternative downlink data at a second time. The serving nodes can alternatively be referred to as transmission points for downlink data transmission. The scheduler can schedule data from any suitable number of serving nodes to any suitable number of user equipment. The scheduler can include the user data queue block 512, the scheduler control 514, the time/frequency resource allocation block 516, the active set and beam management block 518, the CSI computation block 522, and the active set serving node update block 524.

The transceiver 520 can provide a UE report from the user equipment 560 and/or 565 to the scheduler. The UE report can include CSI information and active set information. The UE report can also include any other suitable information from a UE, such as other information from which to determine a selected mode of downlink data transmission. The CSI computation block 522 can compute CSI data from data in the UE report. The active set serving node update block 524 can determine an updated active set for one or more UEs. In some instances, the active set serving node update block 524 can determine an updated active set for a subset of one or more antennas of a UE. The active set serving node update block 524 can use any suitable metrics disclosed herein to determine a selected downlink data transmission mode and update an active set associated with a UE.

The updated active set data is provided to the scheduler control 514. The user data queue block 512 can provide user data to the scheduler control 514. The schedule control 514 provides user data to the transceiver 520 and also provides instructions to the time/frequency resource allocation block 516. The time/frequency resource allocation block 516 can schedule timing and frequency of downlink data transmission from serving nodes 570, 580, and 590. This can avoid timing conflicts and conflicts in the frequency domain. The active set and beam management block 518 can identify serving nodes 570, 580, and 590 for providing wireless transmission services to UEs 560 and 565 from active set data. The active set and beam management block 518 can group downlink data transmissions and manage beamforming from the serving nodes 570, 580, and 590 to UEs 560 and 565. The transceiver 520 provides data for transmission by the serving nodes 570, 580, and 590 to UEs 560 and 565.

As shown in FIG. 5, the scheduler can cause a network system of the heterogeneous MIMO wireless network 500 to wirelessly transmit first user data to a first user equipment 565 in CoMP mode and to wirelessly transmit second user data to a second user equipment 560 in an alternative downlink data transmission mode. Moreover, the scheduler can cause a network system of the heterogeneous MIMO wireless network to wirelessly transmit user data to any suitable number of UEs in CoMP mode and any suitable number of UEs in the alternative downlink data transmission mode.

Network Centric Communication Mode Determination

Figure 6:
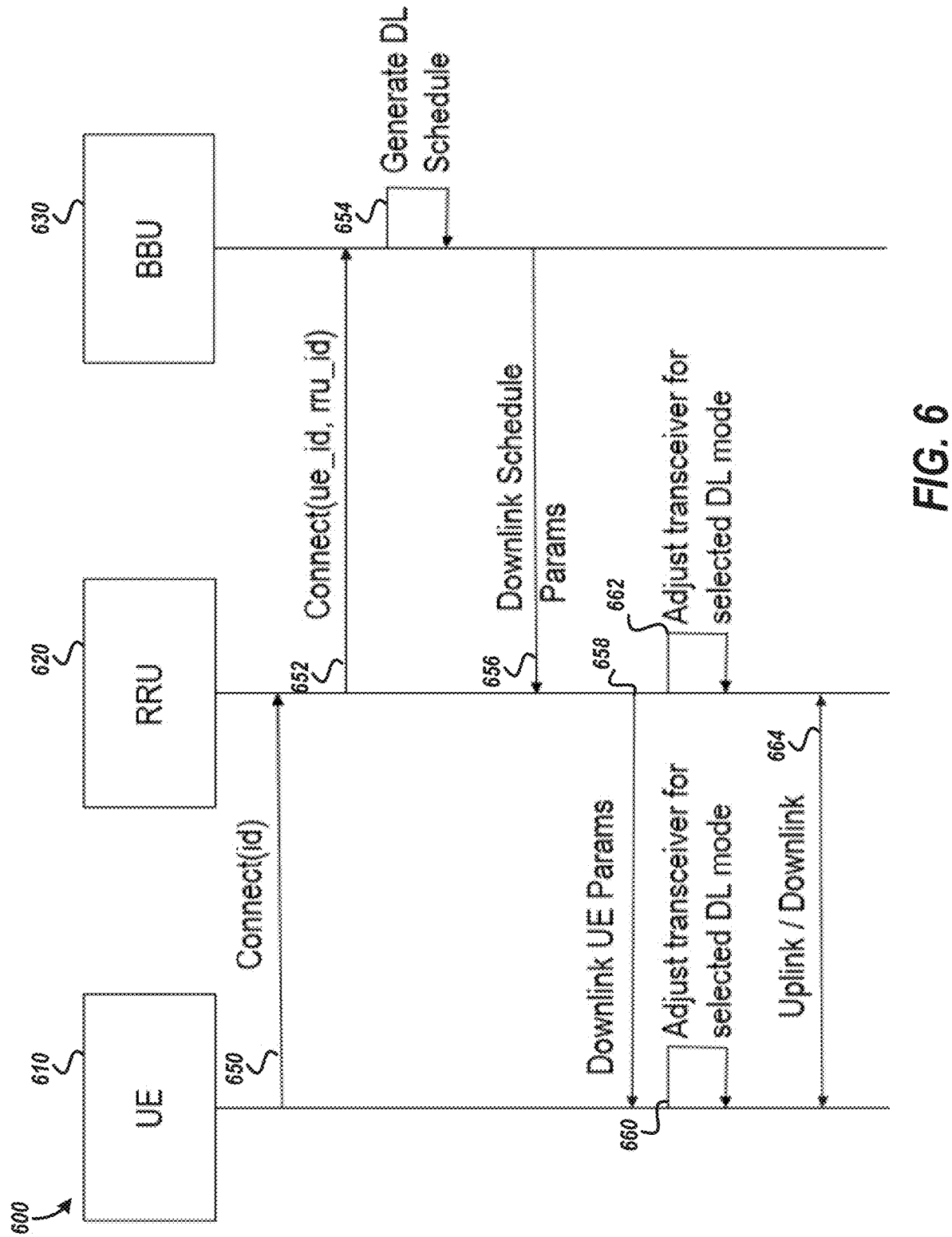
FIG. 6 is a message flow diagram of an embodiment for configuring downlink data transmission for a user equipment.

FIG. 6 is a message flow diagram of an embodiment for configuring downlink data transmission for a user equipment. The message flow 600 illustrates example messages that may be transmitted between a user equipment 610, a remote radio unit 620, and a base band unit 630. Additional or alternative entities may be include to mediate one or more of the interactions shown such as network routers, switches, security devices, or the like.

Via message 650, the UE 610 may request network services via the RRU 620. The connection request may include an identifier for the UE 610 such as a MEID or UUID of the UE 610. In some implementations, the identifier may be associated with account information indicating service levels and other network services accessible by the UE 610. The message 650 may be received via a wireless communication channel connecting the UE 610 with the RRU 620.

Via message 652, the RRU 620 may request connection for the UE 610 from the BBU 630. The request may include the identifier for the UE 610 along with an identifier of the RRU 620 receiving the connection request from the UE 610. The message 652 may be transmitted from the RRU 620 to the BBU 630 using a wired or a wireless communication channel.

Via message 654, the BBU 630 may generate an active set of one or more serving nodes (e.g., RRUs or TRPs) to provide the requested service to the UE 610. The generation of the active set may include generating scheduling information for the UE 610. The scheduling information may identify one or more of transmission mode, time, frequency, power, beamforming matrix, tone allocation, or channel rank for downlink data transmissions to the UE 610. The generation of the active set may include consideration of network system information such as a network load. For example, if the number of UEs serviced by the RRU 620 exceeds a threshold, it may be desirable to assign an active set representing a macro diversity transmission mode.

Via message 656, the BBU 630 may transmit the downlink scheduling parameters to the RRU 620. The parameters may include transmission mode, time, frequency, power, beamforming matrix, tone allocation, or channel rank. The RRU 620 may transmit a message 658 to the UE 610 indicating the active set for the requested downlink transmission service. The message 658 may include transmission parameters the UE 610 may expect from the active set (e.g., transmission mode, time, frequency, power, beamforming matrix, tone allocation or rank).

The UE 610 may, via message 660, adjust a transceiver or other signal processing circuitry based on the parameters received via message 658. The adjustment may include tuning one or more antennas of the UE 610. The adjustment may include changing demodulation and/or decoding pipeline for the UE 610 to properly interpret downlink messages. For example, if the UE 610 is initially assigned a CoMP mode, subsequent conditions may cause the BBU 630 to change the UE 610 to a macro diversity mode. The manner in which received messages are processed (e.g., decoded) may require a change in the demodulation and/or decoding pipeline or other element of the UE 610 to ensure continuity of a data transaction as the mode changes.

Via message 662, the RRU 620 may adjust a transceiver or other signal processing circuitry based on the downlink scheduling parameters received via message 656. The adjustment of the RRU 620 may occur concurrently or at an overlapping time with the adjustment of the UE 610.

Having configured both the RRU 620 and the UE 610 for the downlink data transmission mode identified by the BBU 630, messaging 664 may carry data between the UE 610 and the RRU 620. Other RRUs (not shown) may be configured by the BBU 630 to provide downlink data transmission services. For example, if the downlink transmission mode is a coordinated multipoint mode, the RRU 620 and at least one additional RRU may be configured to transmit data to the UE 610. The uplink and downlink data transmissions can be in different modes. Alternatively or additionally, the uplink and downlink data transmissions can have different associated active sets. For instance, there can be a downlink active set and an uplink active set.

The messaging in FIG. 6 illustrates how an initial active set and network tuning parameters for a first transmission mode may be identified for a UE. As discussed, today's networks are dynamic ecosystems with devices moving, powering on, powering off, and such. These dynamic conditions may cause an initial assessment of a downlink transmission mode to change based on changing network and/or UE characteristics.

Figure 7:
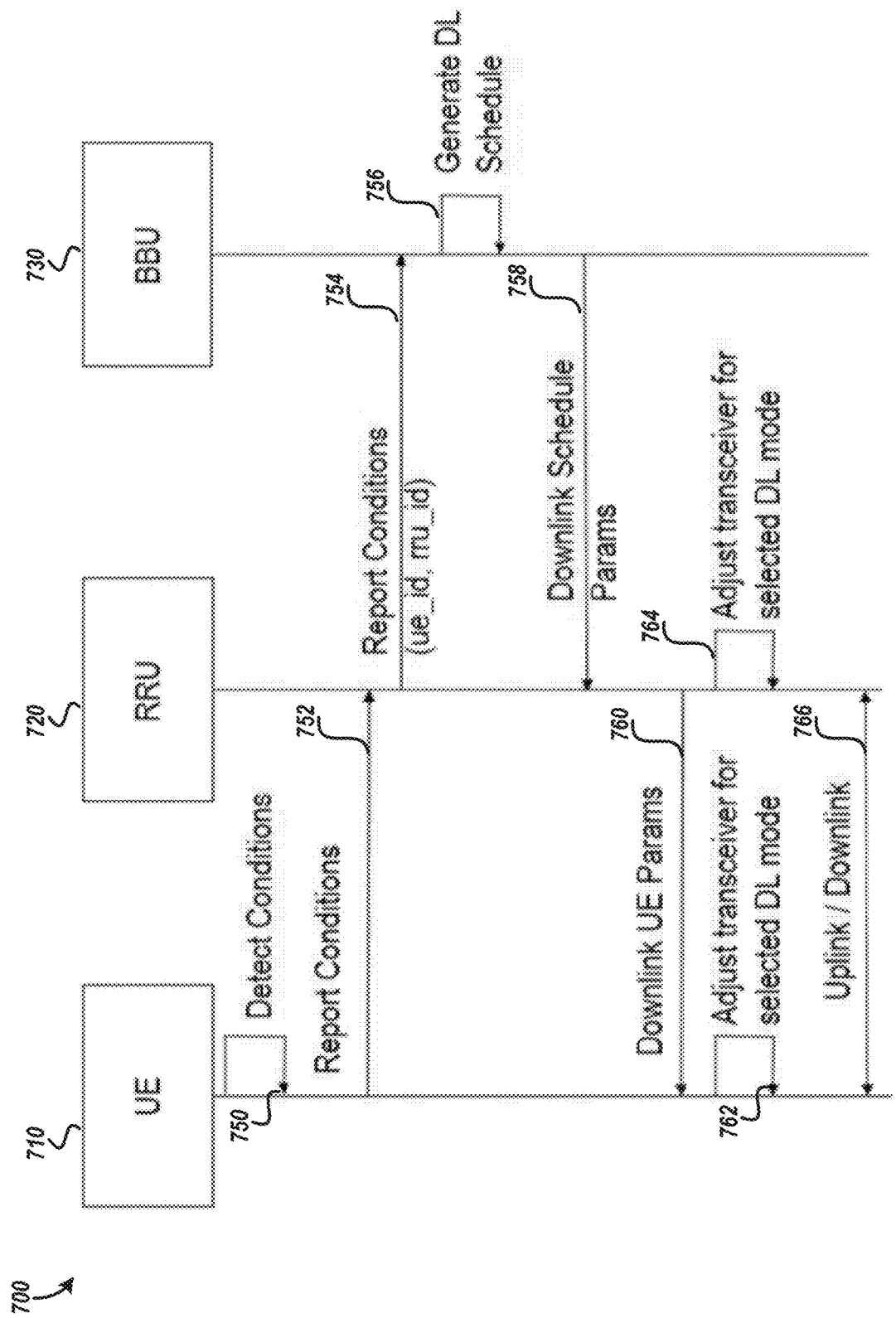
FIG. 7 is a message flow diagram of an embodiment for updating downlink data transmission configuration for a user equipment.

FIG. 7 is a message flow diagram of an embodiment for updating downlink data transmission configuration for a user equipment. The message flow 700 illustrates example messages that may be transmitted between a user equipment 710, a remote radio unit 720, and a base band unit 730. Additional or alternative entities may be include to mediate one or more of the interactions shown such as network routers, switches, security devices, or the like.

Via message 750, the UE 710 may detect UE conditions. The UE conditions that may be detected include channel conditions of the connection with the RRU 720. Channel conditions may include signal strength, signal-to-noise ratio, spatial characteristics, Doppler information, UE capability changes such as active receive and/or transmit antennas. The UE conditions may include an operational characteristic of the UE 710 such as the application(s) executing on the UE 710, communication protocols used by the application(s) executing on the UE 710, or motion of the UE 710 (e.g., Doppler estimation or channel state variation). The UE conditions may include information about the UE 710 such as device type, operating system, peripheral devices attached to the UE 710, or the like.

Via message 752, the UE 710 may provide at least a portion of the UE conditions detected via message 750 to the RRU 720. The message 752 may include a channel state information (CSI) report. In some implementations, the message 752 may include multiple messages, each message including different UE conditions.

Via message 754, the RRU 720 may transmit the condition information to the BBU 730. The message 754 may include identifiers for the UE 710 and the RRU 720 to allow the BBU 730 to associate the condition information with a specific downlink channel (e.g., UE and RRU combination).

Based at least in part on the UE condition information along with network condition information that may be detected by the BBU 730, via message 756, the BBU 730 may generate a downlink schedule for the UE 710. The generation via message 756 may be similar to the generation via message 654 shown in FIG. 6. However, in FIG. 7 the UE 710 may already have an initial active set and transmission mode identified. This initial active set and/or transmission mode may be changed due to changes in network conditions or UE condition information.

The BBU 730 may provide downlink scheduling parameters to the RRU 720. The parameters may include one or more of transmission mode, time, frequency, power, beamforming matrix, tone allocation, or channel rank. The RRU 720 may transmit a message 760 to the UE 710 indicating the active set and/or scheduling parameters for the requested downlink transmission service. The message 760 may include transmission parameters the UE 710 may expect from the active set (e.g., transmission mode, time, frequency, power, beamforming matrix, tone allocation, or channel rank). The message 760 may include an indication of the transmission mode identified for the UE 710.

The UE 710 may, via message 762, adjust a transceiver, a receiver (e.g., a receiver of a transceiver), or other signal processing circuitry based on the parameters received via message 760. The adjustment may include tuning one or more antennas of the UE 710. The adjustment may include changing demodulation and/or decoding pipeline for the UE 710 to properly interpret downlink messages. For example, if the UE 710 is initially assigned a CoMP mode, subsequent conditions may cause the BBU 730 to change the UE 610 to a macro diversity mode. The manner in which received messages are processed (e.g., decoded) may require a change in the demodulation and/or decoding pipeline or other element of the UE 710 to ensure continuity of a data transaction as the mode changes.

Via message 764, the RRU 720 may adjust a transceiver or other signal processing circuitry based on the downlink scheduling parameters received via message 758. The adjustment of the RRU 720 may occur concurrently or at an overlapping time with the adjustment of the UE 710.

Having configured both the RRU 720 and the UE 710 for the downlink data transmission mode identified by the BBU 730, messaging 766 may carry data between the UE 710 and the RRU 720. Other RRUs (not shown) may be configured by the BBU 730 to provide downlink data transmission services. For example, if the downlink transmission mode is a coordinated multipoint mode, the RRU 720 and at least one additional RRU may be configured to transmit data to the UE 710.

Figure 8:
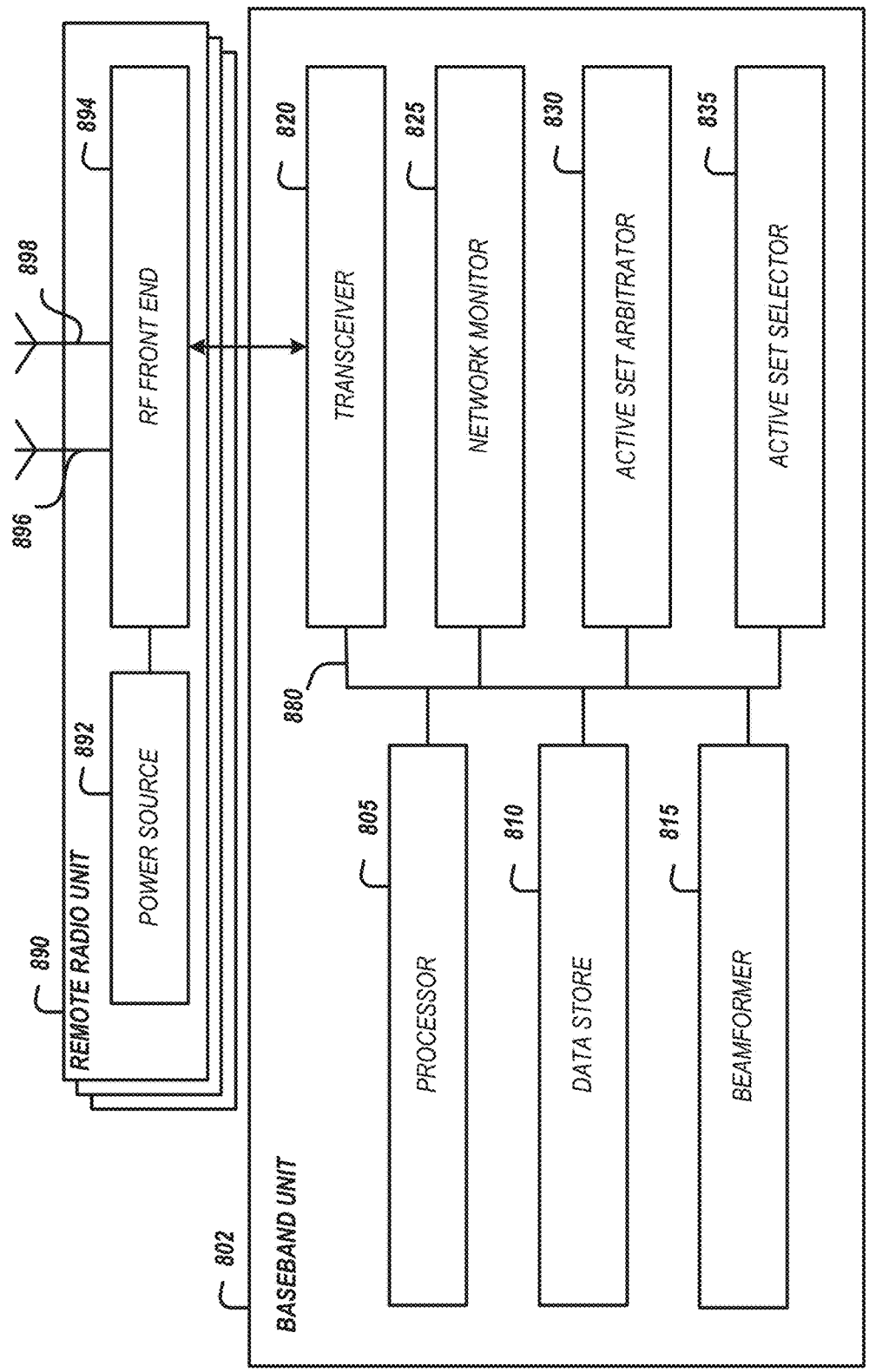
FIG. 8 is a block diagram illustrating network system that includes an example base band unit according to an embodiment.

FIG. 8 is a block diagram illustrating an example base band unit and remote radio unit according to an embodiment. The base band unit 820 may be coupled with at least one remote radio unit 890. The remote radio unit 890 may include at least a first antenna 896 and a second antenna 898 for MIMO wireless communications. Any antenna disclosed herein, such as the antenna 896 or the antenna 898, can be referred to as antenna element. The first antenna 896 and the second antenna 898 may be coupled with a radio frequency (RF) front end 894. The RF front end 894 may process signals received via the first antenna 896 and the second antenna 898. Part of processing a signal may include transmitting the signal to a transceiver 820 included in the BBU 802.

A processor 805 may receive signals received by the transceiver 820. The processor 805 may be configured to determine a type of the signal. For example, if the signal includes a request for connection services, the processor 805 may provide the signal to an active set selector 835. The active set selector 835 may be configured to identify an active set of serving nodes to provide the requested downlink data transmission service. The active set selector 835 can identify the active set for a UE based on information associated with the UE. Alternatively or additionally, the active set selector 835 can identify the active set for a UE based on information associated with one or more other UEs. In some instances, the active set selector 835 can determine a transmission mode for the downlink data transmission service. The BBU 802 may include a network monitor 825 to detect characteristics of the network such as the number of UEs server by each RRU, network data transmission load, or the like. The active set selector 835 may receive the network characteristics from the network monitor 825 as a factor considered when identifying an active set and/or transmission mode for a UE request. A beamformer 815 may be included in the BBU 802 to further identify parameters for the serving nodes (e.g., RRUs) included in an active set. The parameters may include one or more of transmission mode, time, frequency, power, beamforming matrix, tone allocation, or channel rank. The beamformer 815 may determine optimal parameters for RRUs coupled with the BBU 802 that facilitate a network-wide optimization of downlink data transmissions. In some implementations, a UE may provide a requested active set. The BBU 802 may include an active set arbitrator 830 to reconcile a requested active set with an active set selected by the active set selector 835. The active set arbitrator 830 may compare a requested set of serving nodes to the serving nodes identified by the active set selector 835. The comparison may include ordering the serving nodes according to the UE recommendation. In some implementations, the active set arbitrator 830 may provide a message to the UE indicating confirmation or other assessment for a requested active set. For example, if the UE requested nodes A and B but the BBU 802 identified only B in the active set, the message may include a code indicating a partial match for the active set. Other status codes may be included to facilitate efficient communication and assessment of requested active sets. The active set arbitrator 830 may additionally or alternatively compare a requested transmission mode to the transmission mode identified by the active set selector 835 or other element of the BBU 802.

The BBU 802 may include a data store 810. The data store 810 may include instructions that can be executed by the processor 805 to implement the features described. In some implementations, the data store 810 may retain active sets or other scheduling information assigned to UEs served by the BBU 802. The data store 810 may be indexed by UE identifier and/or RRU identifier. This can expedite identification of previously communicated scheduling information for the UE and for monitoring network conditions (e.g., number of UEs allocated to an RRU or antenna element of an RRU).

In addition to providing the scheduling information to the UE, the scheduling information may be used to configure the RRU 890. The configuration may include adjusting the first antenna 896 such as by frequency modulation, time modulation, altering transmission power from a power source 892, or adjusting direction, tone allocation, or beamforming of the transmission.

Figure 9:
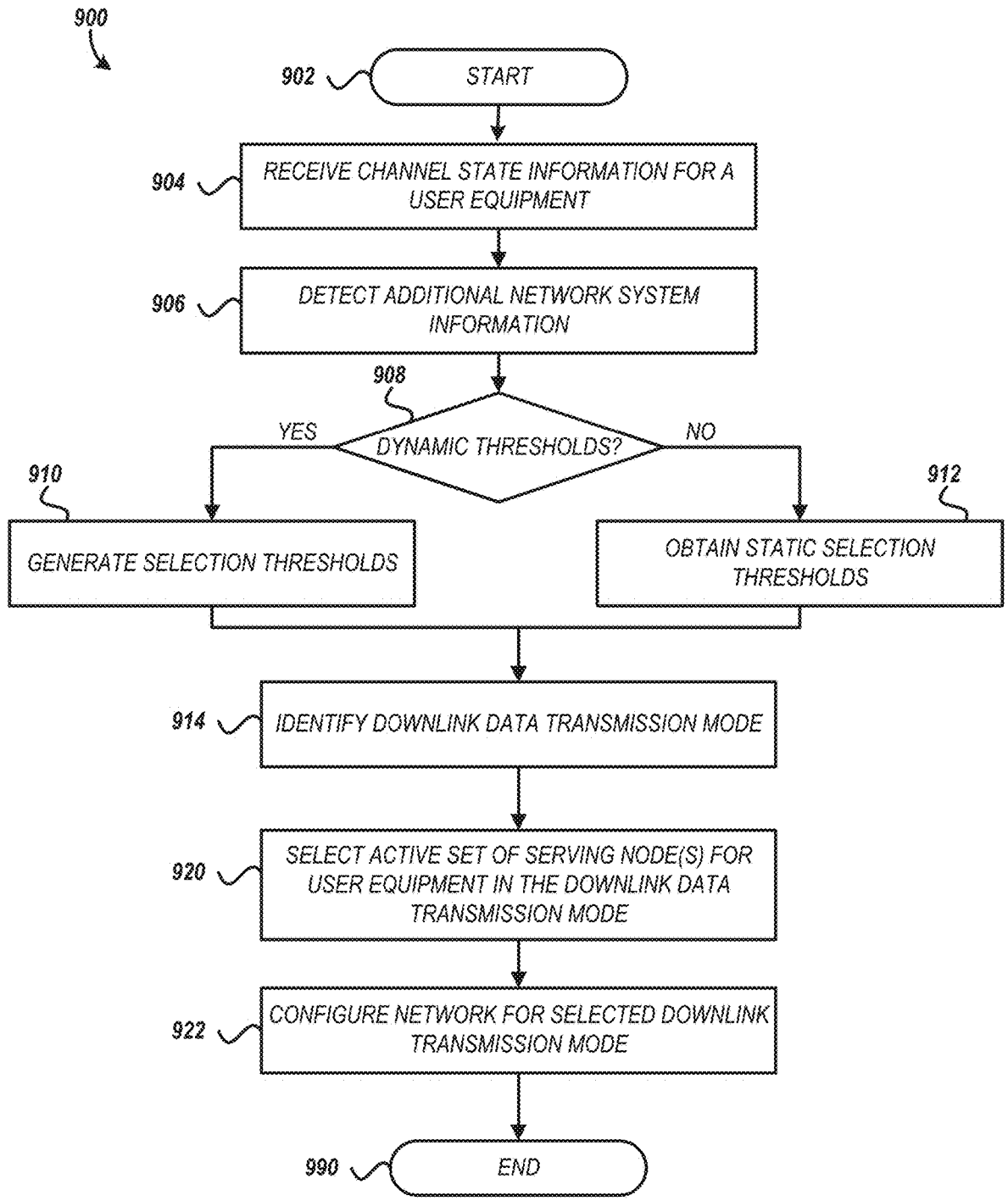
FIG. 9 is a flow diagram illustrating an example method of dynamically configuring downlink data traffic modes for a user equipment in a network.

FIG. 9 is a flow diagram illustrating an example method of dynamically configuring downlink data traffic modes for a user equipment in a network. The method 900 may be performed in whole or in part under control of a coordination device such as a base band unit. The method 900 demonstrates features for identifying coordinated multipoint communication or an alternate mode for downlink data traffic to a UE. The identification includes assessment of network conditions along with properties of the UE to receive the service. A non-transitory computer readable storage medium can store specific instructions that, when executed, cause some or all of the method 900 and/or some or all of any other suitable method disclosed herein to be executed.

The method 900 may begin at block 902. At block 904, the coordination device may receive channel state information for a user equipment. The channel state information may be received as part of a CSI report transmitted by the user equipment. The channel state information may include channel quality indicators for one or more channels available to the UE. The channel state information may include precoding information such as a preferred beamforming matrix for pre-processing signals to be transmitted to the UE. The channel state information may include channel rank information for the channels available to the UE, the desired modulation and coding selection (MCS), and associated active set. The channel rank may indicate a number of spatial layers/channels available for communications with the UE.

At block 906, the coordination device may detect additional network system information. In some implementations, the additional network system information may include a characteristic of the UE. The characteristic of the UE may be received concurrently or separately from the channel state information. Characteristics of the UE which may be received include application(s) executing on the UE which may require the downlink data traffic, communication protocol or data protocol the UE intends to use for the downlink data traffic (e.g., HTTPS, FTP, IMS, VoIP, MPEG-DASH, etc.), mobility of the UE (e.g., Doppler data or other motion estimation), device type, operating system, antenna capabilities (e.g., number of receive antenna), power class or quality of service indicators such as delay and throughput specification. The additional network system information may include a characteristic of the RRU currently serving the UE. For example, the number of UEs currently being served by the RRU may be used to determine a load within the service area of the RRU. The additional network system information may include characteristics of other UEs. Characteristics of multiple UEs or RRUs may be aggregated to generate a metric for the network. For example, an average signal-to-noise ratio may be generated for a sampling of UEs.

At block 908, the coordination device may determine whether dynamic thresholds are used. The determination may be based on a configuration value accessible by the coordination device. In some implementations, the configuration value may indicate whether or not dynamic thresholds should be generated. In some implementations, the configuration value may be implemented as a look up table identifying different threshold techniques based on, for example, UE characteristics, channel state information, time, date, network conditions, etc. If the determination at block 908 is affirmative, at block 910, the coordination device may generate selection thresholds for selecting downlink traffic mode for the UE. The generation may be based on an average mobility of UEs within the network or within a service area of the RRU. The generation may be based on maximum or mean Eigen-value of channel matrices of UEs within the network. The generation may be based on a total number of antennas within the network. In MIMO systems, the number of antennas available may be much greater than the number of RRUs because each RRU may include multiple antennas.

Returning to block 908, if the coordination device determines that thresholds will not be dynamically generated, at block 912, static selection thresholds are obtained. The static selection thresholds may be obtained from a memory or other configuration data store accessible by the coordination device.

At block 914, using either the dynamic thresholds or static thresholds, the coordination device may identify a downlink data transmission mode for the UE. The assessment may compare one or more of the thresholds to specific values for the UE or network to identify a mode. The comparison may be specified in a memory or other configuration data store accessible by the coordination device. For example, the modes may be selected using a truth table whereby satisfaction of certain conditions cause selection of a specific mode. Table 1 provides an example of such a truth table. The truth table may be organized in priority such that the mode corresponding to the first set of conditions met will be used.

TABLE 1

| Option | Condition | Mode |
|---|---|---|
| 1 | UE Mobility < mobility threshold<br>--AND--<br>UE DL Channel Matrix Eigen-value Spread < matrix threshold | Coordinated multipoint |
| 2 | UE Mobility > mobility threshold<br>--OR--<br>UE channel matrix Eigen spread < matrix threshold<br>--OR--<br>UE count – TX Antenna Count > density threshold | Macro diversity |
| 3 | Macro diversity == TRUE<br>--AND -<br>Best effort traffic | Best Server Mode |
| 4 | True (default mode) | Coordinated multipoint |

In some implementations, the truth table may be generated using machine learning. For example, observed characteristics of the network and/or UE may be provided as inputs to a neural network trained using historical active set/mode decisions. The neural network may provide an output vector of including one or more values indicating a predicted active set, transmission mode, or transmission parameters (e.g., time, frequency, power, beamforming matrix, tone allocation, or channel rank.

At block 920, the coordination device may select the serving nodes to provide transmission service according to the transmission mode identified at block 914.

The coordination device may perform the selection at block 920 using the network system information detected at block 906. In some implementations, the UE may identify a neighbor active set of serving nodes. The neighbor active set of serving nodes may include nodes which the UE can detect (e.g., receive transmissions from). The selection may consider any serving nodes currently assigned to the UE along with the neighboring nodes. The coordination device may consider the load for the nodes, current and anticipated location of the UE in comparison to the nodes, or other detectable information. Serving nodes may be selected based on one or more of: (1) the link quality to one or more TRPs in the current active set deteriorates below a threshold; (2) there is one or more new TRPs where the link quality exceed a threshold; or (3) a redirection command is received from the network to redirect the UE such as to distribute load to a more balanced allocation across the network.

As part of the selection, the coordination device may also identify scheduling information for the serving nodes. The scheduling information may be selected to reduce interference between downlink transmissions to the UE and other downlink transmissions. The interference reduction may be achieved by adjusting the one or more of transmission mode, time, frequency, power, beamforming matrix, tone allocation, channel rank, or direction of the transmission relative to other transmissions from the serving node or other serving nodes in proximity to a selected serving node.

At block 922, the coordination device may configure the network for the selected downlink transmission mode. The configuration of the network may include adjusting one or more transceivers at the UE or the RRU. The configuration may also include causing the UE to switch signal processing pipeline for received data transmissions (e.g., enable coordinated multipoint decoding and disable coherent/non-coherent combining). In some implementations, the configuration may include transmitting a physical downlink control channel (PDCCH) message including at least a portion of the configuration information. The configuration information (e.g., active set and/or transmission mode), may be provided to the UE via another control channel message, radio resource control signaling, mobility management protocol, appended to identifiers of the RRUs/TRPs in the active set, or other messaging from the coordination device to the UE.

Having achieved a configuration of the network suited to the network conditions and UE conditions, the method 900 may end at block 990. However, the UE may be configured to periodically or aperiodically provide channel state information reports. The coordination device may repeat the method 900 to assess updated reports. In some implementations, the coordination device may identify a difference between an updated report and a previous report. If the difference does not meet a threshold, the method 900 may not expend the resources to re-assess the downlink traffic configuration for the UE.

The method 900 describes how a network device (e.g., BBU) may direct the downlink traffic configuration for a UE.

Figure 10:
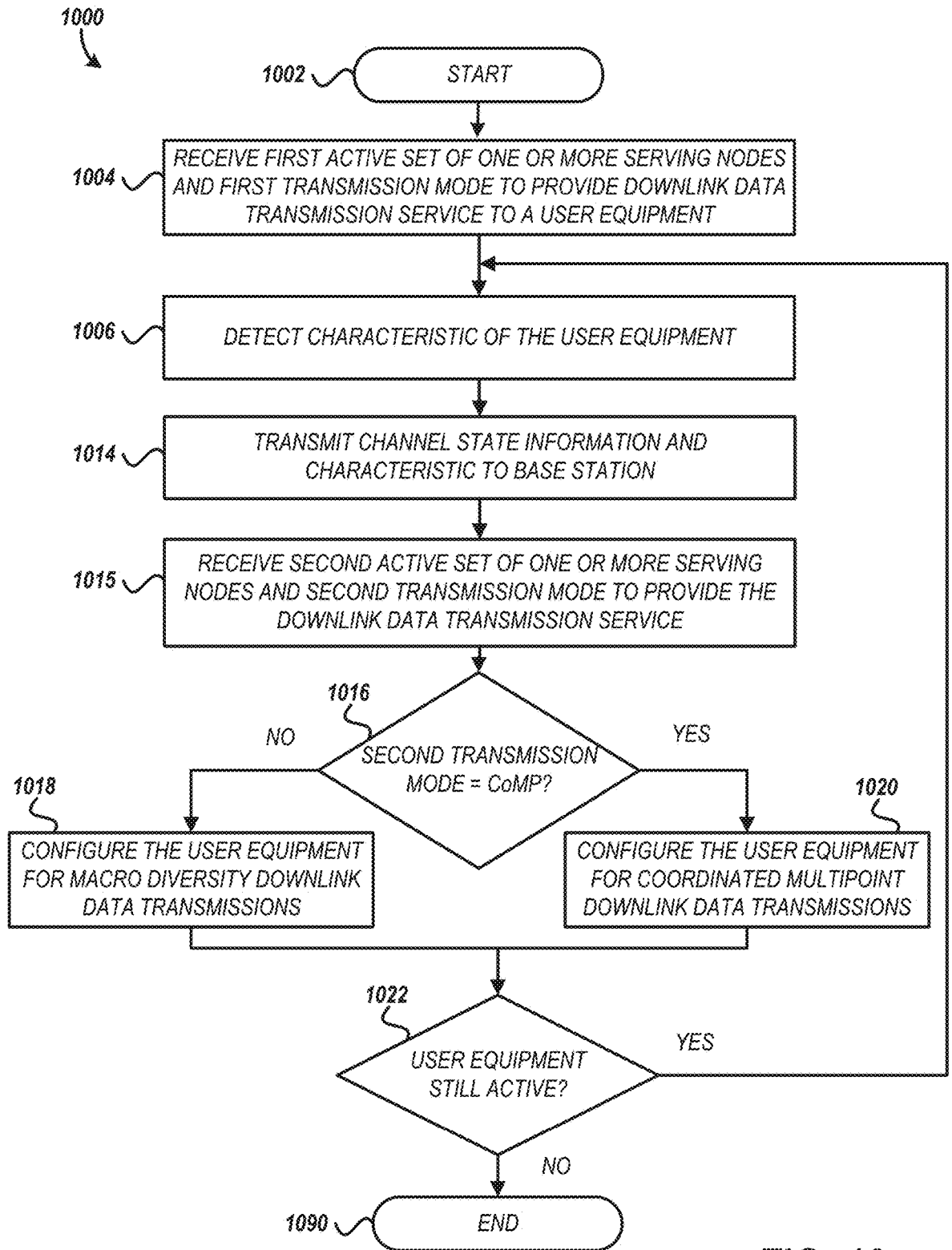
FIG. 10 is a flow diagram illustrating an example method of dynamically configuring downlink data traffic modes for a user equipment in a network from the user equipment's perspective.

FIG. 10 is a flow diagram illustrating an example method of dynamically configuring downlink data traffic modes for a user equipment in a network from the UE's perspective. The method 1000 may be performed in whole or in part under control of a coordination device such as a UE. The method 1-00 demonstrates features for identifying coordinated multipoint communication or an alternate mode for downlink data traffic to a UE. The identification includes providing accurate and updated reports of characteristics of the UE to the BBU and adjusting the UE based on an identified downlink traffic mode.

The method 1000 may begin at block 1002. At block 1004, the coordination device may receive a first active set including one or more serving nodes to provide downlink data transmission service in a first mode to a UE. The first active set and identifier for the first mode may be received from one or more TRPs serving the UE. The first active set and/or the first mode may be identified by a BBU controlling the RRU. The first active set and/or the first mode may be identified by the BBU using the method 900.

At block 1006, the coordination device may detect a characteristic of the UE. The characteristic of the UE may include channel state information. The channel state information may include channel quality indicators for one or more channels available to the UE. The channel state information may include precoding information such as a preferred channel matrix for processing signals received from an antenna of the UE. The channel state information may include a channel rank. Additional or alternative characteristics of the UE which may be received include application(s) executing on the UE which may require the downlink data traffic, communication protocol or data protocol the UE intends to use for the downlink data traffic (e.g., HTTPS, FTP, IMS, VoIP, MPEG-DASH, etc.), mobility of the UE (e.g., Doppler data or other motion estimation), device type, operating system, antenna capabilities (e.g., number of receive antenna), power class, or quality of service.

At block 1014, the coordination device may transmit the channel state information and the characteristic to a BBU (e.g., base station). The channel state information may be provided using a channel state information report. The additional characteristic(s) may be provided as a part of the report or via a separate message transmitted by the coordination device.

At block 1015, the coordination device may receive a second active set of one or more serving nodes to provide the downlink data transmission service in a second mode. At this point in the method 1000, the UE is being asked to switch modes from the first mode to a second mode. The coordination device may first determine which mode is to be used for downlink data traffic based on the received message and then adjust accordingly.

At block 1016, the coordination device may determine whether the second transmission mode is CoMP. The determination at block 1016 may include comparing a transmission mode identifier included in a message received from an RRU to a predetermined value associated with CoMP. If the determination at block 1016 is negative, at block 1018, the coordination device may configure (e.g., adjust) the user equipment for macro diversity downlink data transmissions. If the determination at block 1016 is affirmative, at block 1010, the coordination device may configure (e.g., adjust) the user equipment for coordinated multipoint downlink data transmissions.

After configuring the UE for the selected downlink data traffic mode, at block 1022, the coordination device may determine whether the UE is still actively using the downlink channel. The determination may be based on receipt or transmission a message to or from the UE. The determination may be based on execution status of an application or the operating system. For example, the operating system of the UE may include an airplane mode or a mode whereby all wireless communications are turned off. The determination may be based on a power state for the UE (e.g., powering down). If the UE is no longer active, the method 1000 may end at block 1090. If the UE is still active, the method 1000 may return to block 1006 to detect and transmit updated characteristics to thereby receive additional downlink transmission configuration information selected based on the updated characteristics.

User Equipment Assisted Communication Mode Determination

User equipment can determine a desired mode in which to receive a downlink data transmission. The desired mode can be either CoMP mode or the alternative downlink data transmission mode. Then the user equipment can send a request to a network system, such as a base station, to provide the downlink data transmission in the desired mode. The request can include desired active set data that identifies a desired active set of one or more serving nodes associated with the desired mode. The request can include an identifier for a desired transmission mode. The identifier may be a mode select bit included in the request, a message transmitted by the UE, or a value appended to one or more of the identifiers of the desired active set of one or more serving nodes. The network system can determine a mode of downlink data transmission to the user equipment based on the request and other data. This can contribute to the operation of a high data rate and high reliability wireless network.

The user equipment can determine the desired mode for all antennas of the user equipment. In some instances, the desired mode can be determined for a particular antenna or subset of antennas of the user equipment. Accordingly, in certain instances, a subset of antennas of a user equipment can receive first user data in CoMP mode and a different subset of the antennas of the same user equipment can receive second user data in the alternative downlink data transmission mode.

The user equipment can determine the desired mode of operation based on any suitable information available to the user equipment, such as any suitable information disclosed herein associated with mode determination. Such information can include, for example, mobility data, a network to user equipment channel matrix condition, inference data, metrics or other data associated with serving nodes of a current active set, metrics or other data associated with neighbor nodes, the like, or any suitable combination thereof. Examples of metrics or other data associated with nodes include received signal strength indicator, signal-to-noise ratio estimate, or error rate statistics. Accordingly, based on information available to the UE, a request can be generated by the UE to receive data in a desired mode of operation.

The request to operate in the desired mode can include information to indicate that the user equipment would like to change from one mode to another. For example, the request can include information indicating to toggle between receiving data in the CoMP mode and the alternative downlink data mode. In some instances, active set data of the request can indicate to operate in the same mode with a different set of serving node(s). As one example, the request can indicate to continue receiving data in CoMP mode from a different set of serving nodes than the current active set. As another example, the request can indicate to continue receiving data in the alternative downlink data mode from a different set of serving node(s) than the current active set.

Figure 11:
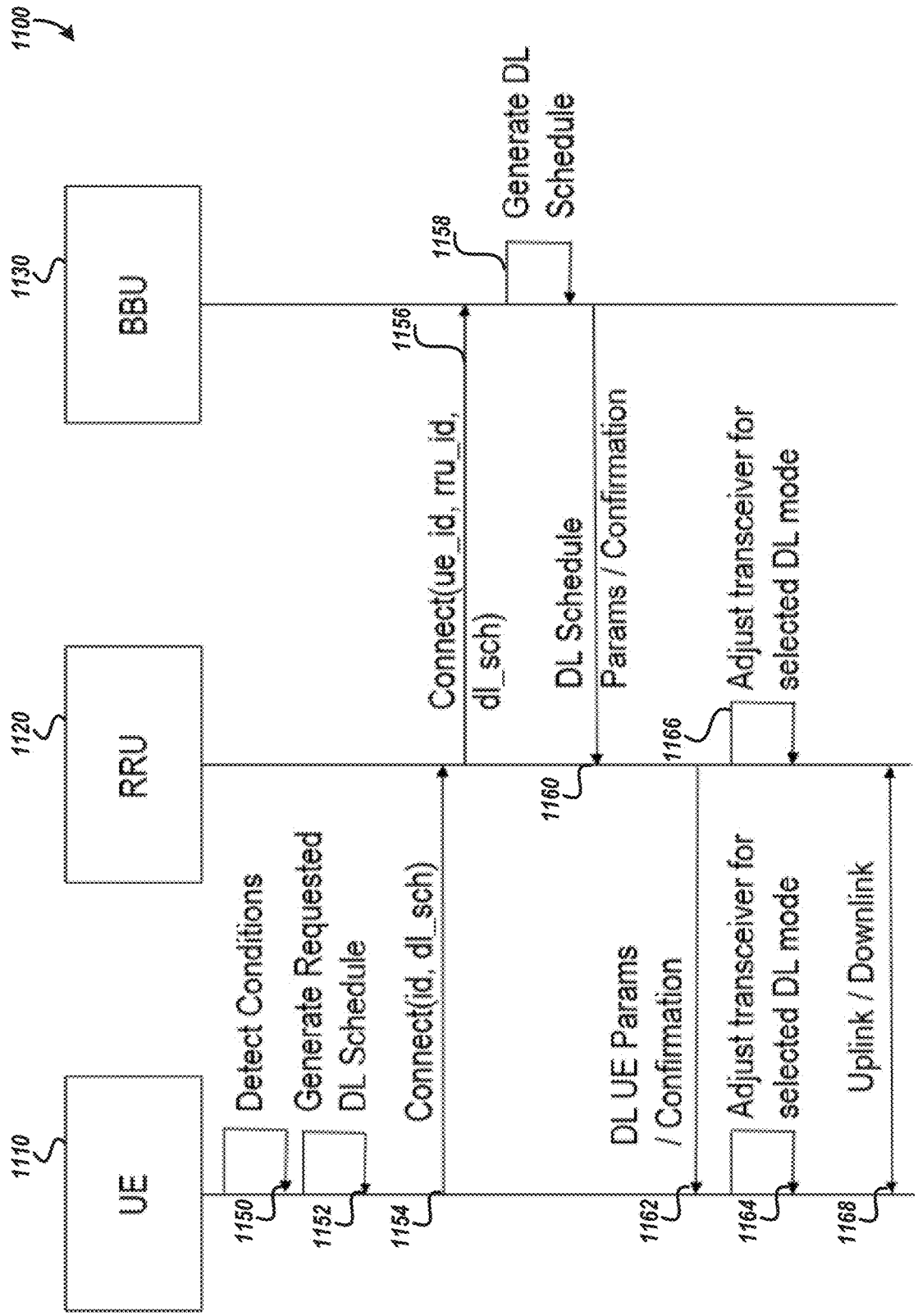
FIG. 11 is a diagram that illustrates representative communications and events in a heterogeneous MIMO network associated with a user equipment requesting to receive downlink data in a desired mode according to an embodiment.

FIG. 11 illustrates representative communications and events in a heterogeneous MIMO network 1100 associated with a user equipment 1100 requesting to receive downlink data in a desired mode. The communications and events of FIG. 11 are associated with the user equipment 1110, a remote radio unit (RRU) 1120, and/or a base band unit (BBU) 1130 of the heterogeneous MIMO network 1100. In the communications and events of FIG. 11, the UE 1110 selects a desired mode to receive a downlink data transmission and the BBU 1130 generates a downlink schedule to schedule downlink data transmissions from one or more serving nodes to the UE 1110.

In event 1150 of FIG. 11, the UE 1110 detects conditions. The UE 1110 can gather any suitable information from which to determine a desired mode to receive a downlink data transmission. The UE 1110 can detect any suitable information disclosed herein for mode determination. The UE 1110 selects a desired mode of receiving downlink data transmissions based on the gathered information. This determination can be based on any suitable principles and advantages disclosed herein.

The UE 1110 stores and updates an active set of one or more serving nodes that provide wireless transmission services to the UE 1110. Active set data is provided by a network system that includes the RRU 1120 and the BBU 1130. The UE 1110 also stores and updates a neighbor set of one or more serving nodes that are available to provide wireless transmission services to the UE 1110 and are not included in the active set. The UE 1110 may also store scheduling information such as the transmission mode or other parameters for transmissions to or from the UE 1110.

The UE 1110 generates a requested downlink schedule at event 1152. The requested downlink schedule includes desired active set data identifying one or more serving nodes from which the UE 1110 requests to receive downlink wireless transmission services. The desired active set data can include one or more serving nodes from the active set and/or one or more serving nodes from the neighbor set. The desired active set data is based on the determination of the desired mode by the UE 1110. The schedule may include information identifying a desired transmission mode.

In event 1154, the UE 1110 and the RRU 1120 establish a wireless connection. This can include providing a UE identifier and a requested downlink schedule. The RRU 1120 and the BBU 1130 communicate at event 1156. The downlink schedule is provided from the RRU 1120 to the BBU 1130. The RRU 1120 can also provide a UE identifier and an RRU identifier to the BBU 1130.

The BBU 1130 includes a scheduler that generates a downlink schedule at event 1158. BBU 1130 can receive information from a plurality of UEs and take into account more information than available to a single UE in determining the downlink data transmission mode to the UE 1110. Accordingly, it can be advantageous for a network system to determine the downlink data transmission mode to the UE 1110 even if the UE 1110 requests to receive downlink data in a particular mode. The network system may additionally or alternatively identify an active set of service nodes for data transmissions for the UE 1110.

The serving node schedule can be determined based on a request from the UE 1110 to receive downlink data in a desired mode and additional network system information. The additional network system information can include, for example, one or more of system load information such as load information for coordinated multipoint resources, data indicating a mobility state of the UE 1110, a spatial channel condition of a channel associated with the UE 1110, one or more characteristics of the UE 1110 (e.g., an application type to utilize the transmission service, a protocol to utilize over the transmission service, or a device type for the UE 1110), one or more characteristics of one or more UEs other than the UE 1110, one or more conditions of one or more UEs other than the UE 1110, one or more behaviors of one or more UEs other than the UE 1110, the like, or any suitable combination thereof.

Based on the request and the additional network system information, the scheduler of the BBU 1130 can (1) grant the request, (2) continue to schedule downlink data transmission to the UE 1110 without changing the mode of operation or the active set for the UE 1110, or (3) cause the way the UE 1110 is being served to change in a way that is different than requested by the UE 1110.

The request can be granted when the additional network system information is consistent with providing downlink data transmission to the UE 1110 in the desired mode. To grant the request, the scheduler can update the active set for the UE 1110 to match the desired active set in the request. Then the scheduler can cause downlink data transmission to the UE 1110 in the desired mode from the one or more serving nodes of the desired active set.

In some instances, the additional network system information can indicate that the active set and current mode of operation can provide better overall network services than granting the request. Accordingly, in such instances, the scheduler can continue to route downlink data to the UE 1110 without changing the mode of operation or the active set for the UE 1110.

The scheduler can cause the way the UE 1110 is being served to change differently than requested by the UE 1110 based on the request and the additional network system information. For example, the scheduler can determine to update the active set for the UE 1110 in a different way than requested by the UE based on the request and the additional network system information. According to some other instances, the scheduler can cause a power level of a downlink data transmission to the UE 1110 to be adjusted based on the request and the additional network information. Any other parameter of the transmission from the network system, such as frequency and/or time, can be similarly adjusted.

Referring back to FIG. 11, the BBU 1130 can provide downlink scheduling parameters to the RRU 1120 in event 1160. This can include providing updated active set data for the UE 1110. Any other suitable scheduling information can be provided to the RRU 1120. In some instances where downlink scheduling parameters are unchanged, a confirmation that the downlink scheduling parameters are unchanged and be sent in place of the downlink scheduling parameters. Although FIG. 11 illustrates the same RRU 1120 receiving a request downlink schedule from the UE 1110 and providing a downlink schedule to the UE 1110, different RRUs can facilitate communication between the UE 1110 and the BBU 1130 for different communications as suitable.

As shown in FIG. 11, the RRU 1120 can provide downlink parameters to the UE 1110 in event 1162. This can include providing the UE 1110 with updated active set data and/or one or more other parameters to configure the UE 1110 for receiving downlink data from the network based on the downlink data transmission schedule determined by the scheduler. In some instances where downlink UE parameters are unchanged, a confirmation that the downlink UE parameters are unchanged and be sent in place of the downlink UE parameters.

The UE 1110 can adjust a receiver of the UE 1110 for receiving data for the selected downlink transmission mode in event 1164. The receiver of the UE 1110 can be adjusted for processing downlink data received in the selected mode from one or more serving nodes in the active set provided by the network system. The receiver of the UE 1110 can be adjusted for receiving signals having a different power, direction, timing, frequency, or any suitable combination thereof. This can involve adjusting any suitable circuitry of the receiver. The receiver of the UE 1110 can be included in a transceiver.

In event 1166, a transmitter of the RRU 1120 can be adjusted for transmitting downlink data in the selected mode to the UE 1110. This can involve adjusting one or more of a transmission power, direction, timing, or frequency of a downlink data transmission from the RRU 1120. Adjusting the transmitter can involve adjusting any suitable circuitry of the transmitter. The transmitter can be included in a transceiver of the RRU 1120.

The UE 1110 and the RRU 1120 wirelessly exchange downlink data and uplink data in event 1168. During this exchange of data, the UE 1110 can provide updated data to the BBU 1130 including an updated requested downlink schedule request and additional data associated with the UE from which to determine the selected mode of downlink data transmission. Accordingly, the scheduler of the BBU 1130 can dynamically select the mode of downlink data traffic in the heterogeneous MIMO network 1100.

As discussed above, a variety of different UEs can wirelessly communicate with serving nodes in a heterogeneous MIMO network. As example UE will be discussed with reference to FIG. 12.

Figure 12:
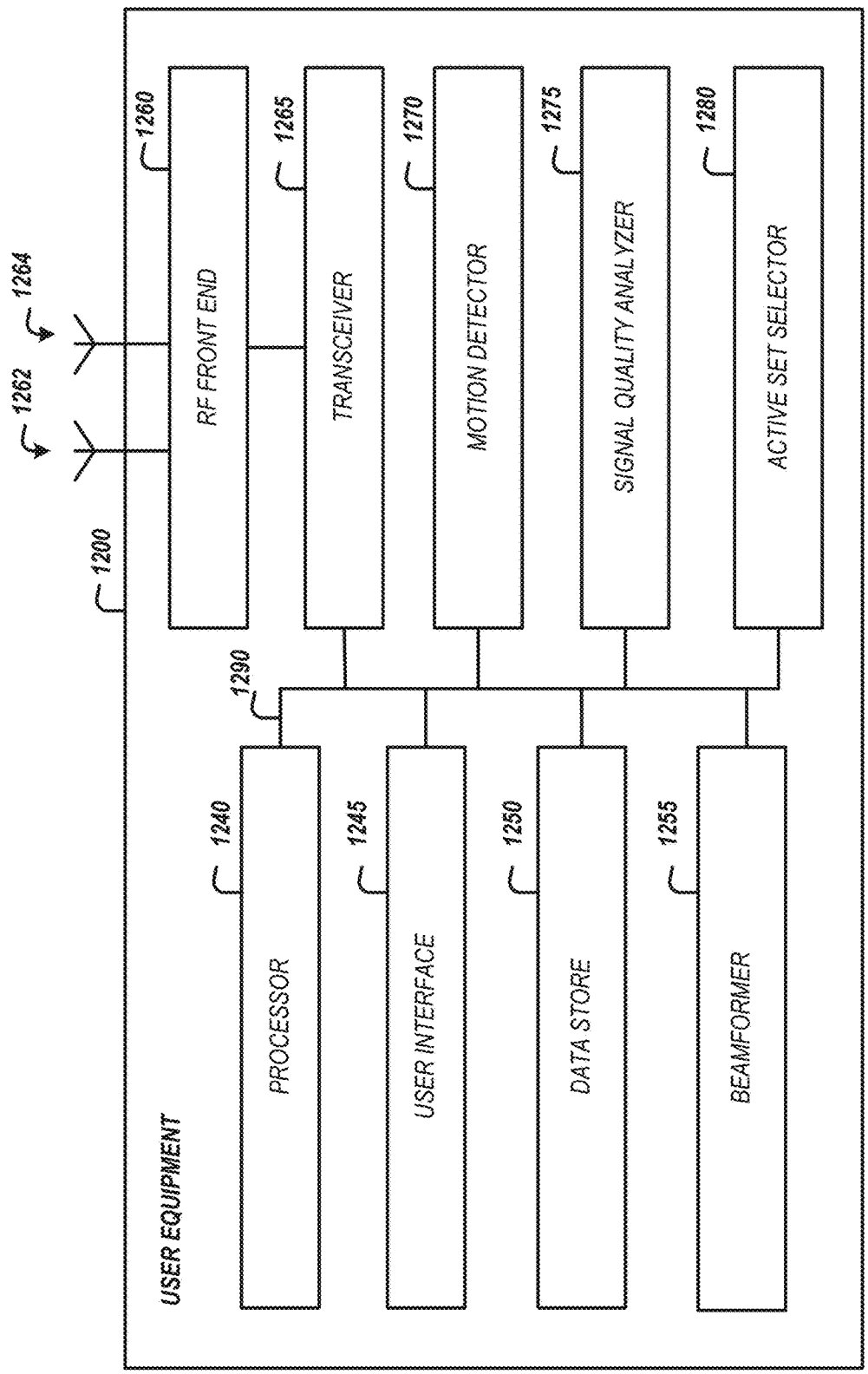
FIG. 12 is a schematic block diagram of an example UE according to an embodiment.

FIG. 12 is a schematic block diagram of an example UE 1200 according to an embodiment. The UE 1200 is configured for wirelessly communicating with a base station in a heterogeneous MIMO network. As illustrated, the UE 1200 includes a processor 1240, a user interface 1245, a data store 1250, a beamformer 1255, antennas 1262 and 1264, a transceiver 1265, a motion detector 1270, a signal quality analyzer 1275, and an active set selector 1280. Some other UEs can include additional elements and/or a subset of the elements illustrated in FIG. 12.

The UE 1200 includes a plurality of antennas 1262 and 1264. Any suitable number of antennas can be included for wireless communication in CoMP mode and/or the alternative downlink data transmission mode. The UE 1200 can include one or more arrays of antennas. A radio frequency (RF) front end 1260 can process RF signals received via the antennas 1262 and 1264. The RF front end can also provide RF signals to the antennas 1262 and 1264 for transmission. The transceiver 1265 includes a transmitter and a receiver. The transceiver 1265 can provide processing for transmitting and receiving RF signals associated with the antennas 1262 and 1264.

The processor 1240 is in communication with the transceiver 1265. The processor 1240 is implemented by physical hardware arranged to perform specific operations to implement functionality related to determining a desired mode and causing a request related to the desired mode to be transmitted from the UE 1200. The processor 1240 can determine a desired mode in which to receive downlink data and generated a request to receive downlink data in the desired mode in accordance with any suitable principles and advantages disclosed herein. The processor 1240 can cause active set and neighbor set data to be stored and updated. The processor 1240 can perform any other suitable processing for the UE 1200.

The processor 1240 can be in communication with the motion detector 1270 and the signal quality analyzer 1275. Accordingly, the processor 1240 can receive and process information associated with conditions of the UE 1200. The motion detector 1270 can include any suitable hardware arranged to detect mobility information associated with the UE 1200. The signal quality analyzer 1275 can analyze the quality of signals received and/or transmitted by the antennas 1262 and 1264. This can provide information associated with a spatial channel condition of the UE 1200. The information associated with conditions of the UE 1200 can be provided to the processor 1240 for determining a desired mode in which to receive downlink data. In some instances, some or all of the functionality of the motion detector 1270 and/or the signal quality analyzer can be implemented by the processor 1240.

The active set selector 1280 can identify a desired active set of one or more serving nodes associated with the desired mode determined by the processor 1240. The active set selector 1280 can select the desired active set based on data associated with one or more of: one or more serving nodes in the active set, one or more serving nodes in the neighbor set, mobility data associated with the UE 1200, a spatial channel condition associated with the UE 1200, or one or more characteristics of the UE 1200. Desired active set data can be provided with the request to operate in the desired mode. The active set selector 1280 can be implemented by dedicated circuitry and/or circuitry of the processor 1240.

The beamformer 1255 can perform any suitable beamforming functionality for the UE 1200. The beamformer 1255 can set and/or adjust one or more parameters associated with receiving and/or transmitting signals associated with the antennas 1262 and 1264 of the UE 1200. The beamformer 1255 can be implemented by dedicated circuitry and/or circuitry of the processor 1240.

The UE 1240 includes a data store 1250. The data store 1250 can store instructions that can be executed by the processor 1240 to implement the features described. The data store 1250 can store active set data and neighbor set data for the UE 1200. The data store 1250 can store any other suitable data for the UE 1200. The data store 1250 can include any suitable memory elements arranged to store data.

Several elements included in the UE 1200 may be coupled by a bus 1290. The bus 1290 can be a data bus, communication bus, other bus, or any suitable combination thereof to enable the various components of the UE 1200 to exchange information.

As illustrated, the UE 1200 also includes a user interface 1245. The user interface 1245 can be any suitable user interface, such as a display and/or an audio component. In some instances, the user interface 1245 can include one or more of touch screen capabilities, a button, a knob, a switch, or a slider.

Figure 13:
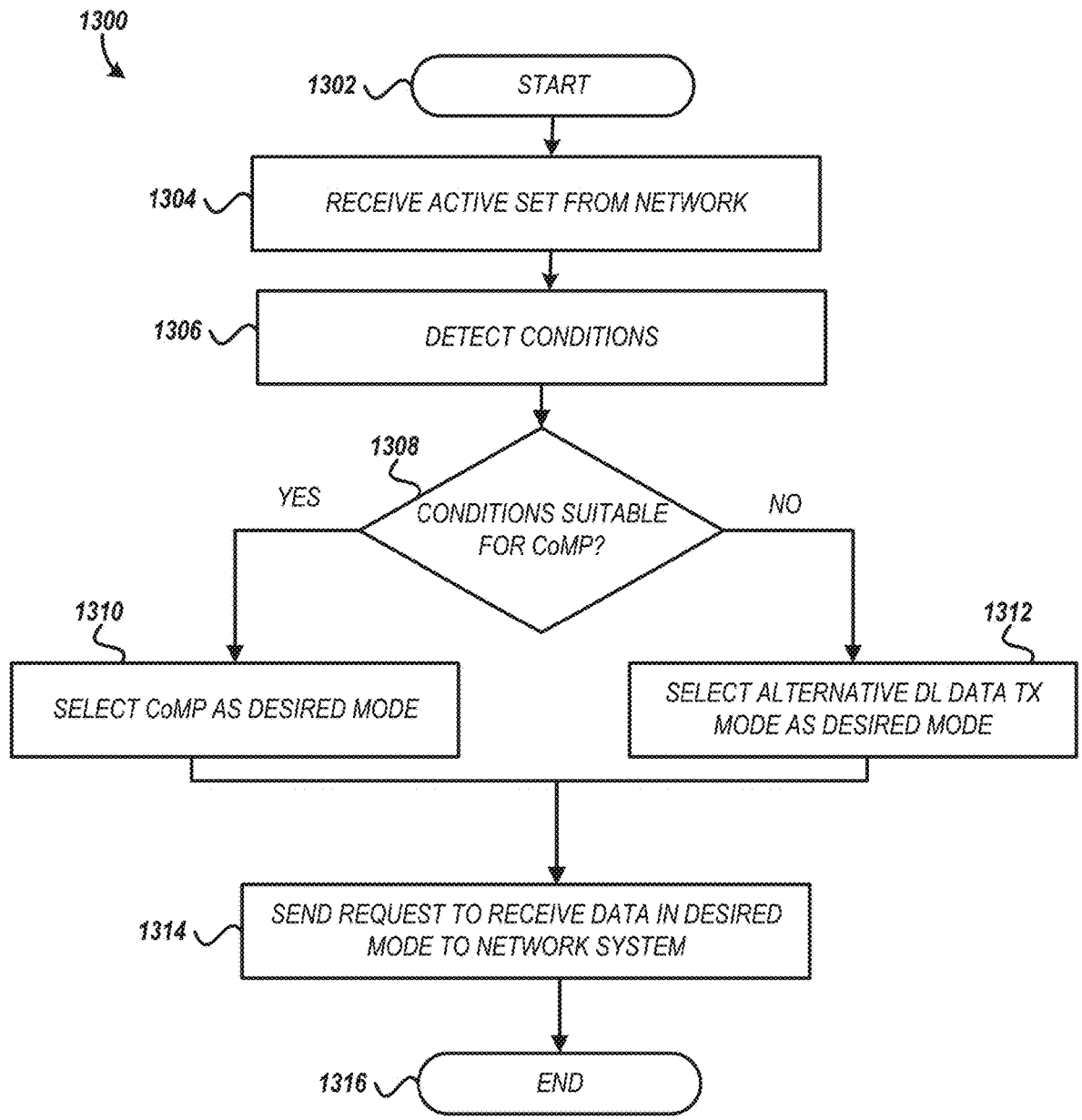
FIG. 13 is a flow diagram of an example process of requesting a selected communication mode in which to receive data at an antenna of a UE according to an embodiment.

FIG. 13 is a flow diagram of an example process 1300 of requesting a selected communication mode in which to receive data at an antenna of a UE according to an embodiment. The process 1300 can be performed by any suitable UE, such as any suitable UE disclosed herein. The process 1300 illustrates aspects of a UE generating and sending a request to receive downlink data in a desired mode of operation. The process 1300 can be performed in each of a plurality of UEs that are concurrently wirelessly communicating with the same base station.

The process 1300 begins at block 1302. At block 1304, active set data transmitted from a base station is received by a UE. The active set data identifies a set of one or more serving nodes to provide downlink data to the UE. The UE stores the active set data and updates the active set data in response to receiving updated active set data from the base station. The active set data can be received by the processor 1240 and stored in the data store 1250 of the UE 1200 of FIG. 12, for example.

The UE detects conditions at block 1306. Detecting conditions associated with the UE can provide useful information from which the UE generates a request to receive downlink data in a selected mode. The detected conditions can include any suitable conditions and/or metrics disclosed herein. For example, the UE can detect a mobility state of the UE and/or a spatial channel condition of the UE. One or more conditions can be detected using the motion detector 1270 and/or the signal quality analyzer 1275 of the UE 1200, for example.

The UE determines a selected mode of wirelessly receiving data using an antenna element. The selected mode is either a coordinated multipoint mode or an alternate downlink data transmission mode. The selected mode can be determined in accordance with any suitable principles and advantages disclosed herein. A processor, such as the processor 1240 of the UE 1200, can be used to determine the selected mode. The selected mode can be for some or all of the antennas of the UE. At decision block 1308, the UE can determine whether conditions are suitable for CoMP. If conditions are suitable for CoMP mode, CoMP mode is selected as the desired mode at block 1310. Alternatively, if one or more conditions are unsuitable for CoMP mode, an alternative downlink data transmission mode is selected as the desired mode at block 1312. The alternative downlink data transmission mode can be any suitable alternative downlink data transmission mode disclosed herein.

The determination of the selected mode can be based on the conditions detected at block 1306. For instance, the selected mode can be determined based on a mobility state of the UE and/or a spatial channel condition of the UE. A threshold level of the mobility state associated with operating in the CoMP mode can be determined based on the conditions detected at block 1306. Alternatively or additionally, a threshold level of the spatial channel state condition associated with operating in the CoMP mode can be determined based on the conditions detected at block 1306.

In some implementations, the UE may additionally or alternatively identify a desired active set of serving nodes for wirelessly receiving data. The desired serving nodes may be identified based on the conditions detected at block 1306. For example, the UE may detect a signal from a TRP and based on received-signal-strength or other metric for one or more signals from the TRP, determine the quality for transmissions received from the TRP.

At block 1314, the UE can send a request via at least one antenna to receive data in the selected mode. The processor of the UE can cause the transmission via at least one antenna of the UE. For instance, in the UE 1200, the processor 1240 can cause transmission of the request using antenna 1262. The request can include a desired active set. The request can include information identifying the selected mode, such as one or more mode select bits. The process ends at block 1316.

Some or all of the process 1300 can be performed repeatedly while the UE is active. Accordingly, the UE can provide requests to receive data in a desired mode based on up to date conditions detected by the UE. The request can be updated periodically and/or dynamically. As one example, a UE can be located in a crowded football stadium and request to receive data in the CoMP data transmission mode because of, for instance, a higher number of TRPs that are likely available in the stadium. After the UE leaves the football stadium and is located in a residential area, the UE can request to receive data in an alternative downlink mode because the TRPs may be more sparsely distributed in the residential area than in the stadium. As another example, the UE can receive data in the CoMP mode while the UE has relatively low mobility. In response to a significant increase in mobility, such as being located in a vehicle on a highway, the UE can request to receive data in the alternative downlink data transmission mode.

Figure 14:
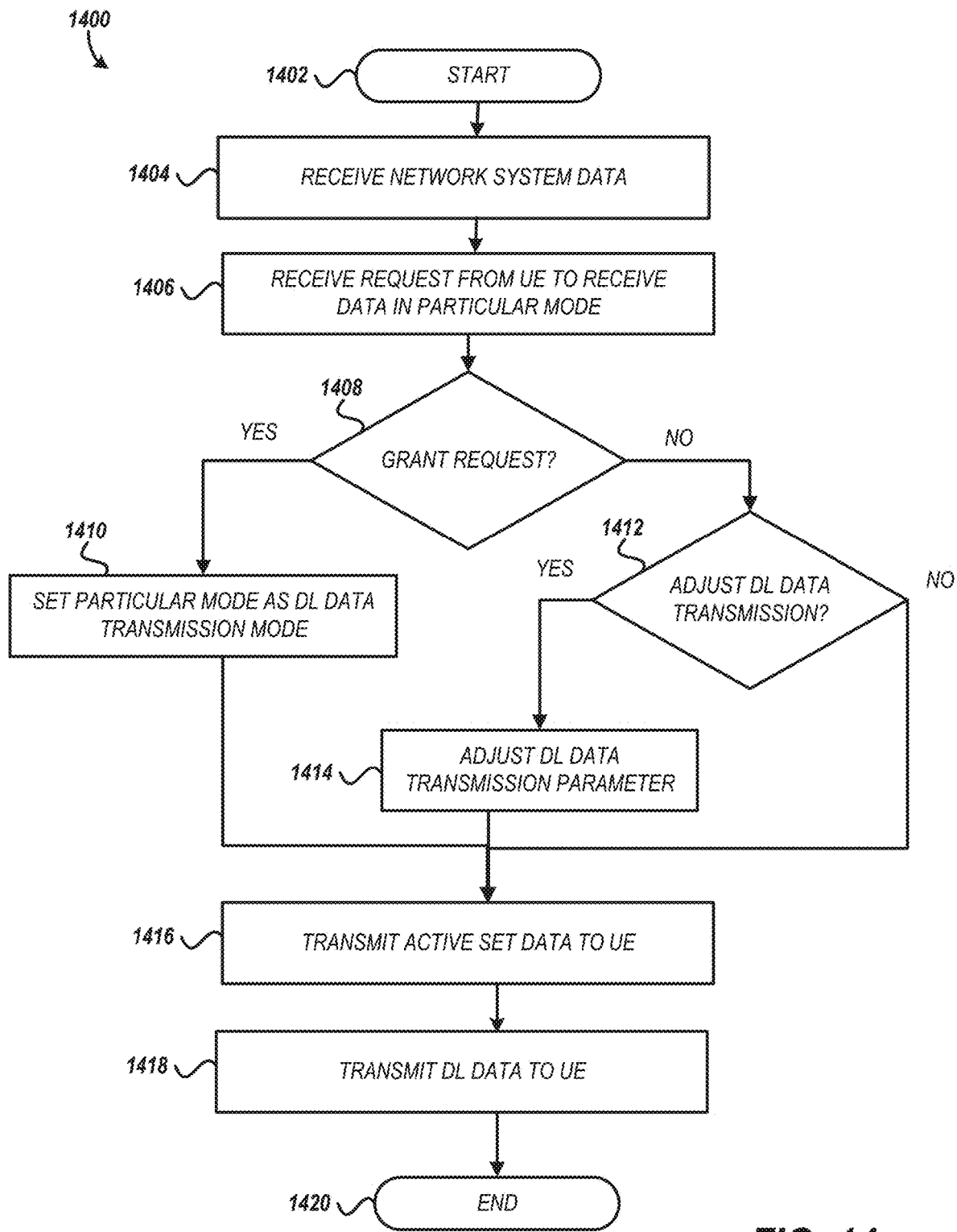
FIG. 14 is a flow diagram of an example process of controlling a downlink data transmission mode to a UE based on a request from the UE according to an embodiment.

FIG. 14 is a flow diagram of an example process 1400 of controlling a downlink data transmission mode to a UE based on a request from the UE according to an embodiment. The process 1400 can be performed by any suitable network system, such as any suitable base station. For instance, some or all of the process 1400 can be performed by the baseband unit 510 of FIG. 5 and/or the baseband unit 820 of FIG. 8. The process 1400 illustrates aspects of a network system determining a downlink data transmission mode based on a request from a UE to receive data in particular mode and additional network system information.

The process 1400 begins at block 1402. At block 1404, a scheduler of the network system receives network system information. The network system information can be received via one or more antennas of a base station. The network system information can be received from a plurality of UEs. Accordingly, the scheduler can have access to additional data that is unavailable to a UE requesting to receive downlink date in the particular mode. The network system information can include any suitable information from which a network scheduler determines a mode of downlink data transmission to a UE disclosed herein. The network system information can include mobility state information for one or more UEs, spatial channel state conditions for one or more UEs, system load information, characteristics of one or more UEs, the like, or any suitable combination thereof. The scheduler receives a request from a UE to receive downlink data in a particular mode at block 1406. The request can include desired active set data and/or a one or more mode select bits.

Based on the request and additional network system information, the scheduler determines a downlink data transmission mode for wirelessly transmitting data to a UE. The scheduler can also determine the active set for a UE and/or a subset of antennas of a UE. The determined downlink data transmission mode is either CoMP mode or an alternative downlink data transmission mode. The alternative downlink data transmission mode is a non-CoMP mode. The alternative downlink data transmission mode can be, for example, synchronized transmission across multiple network nodes for coherent combining, transmissions across multiple network nodes for non-coherent combining, or individual transmission from a selected best serving node.

Referring to FIG. 14, at decision block 1408, the scheduler determines whether to grant the request. The request can be granted or denied based on any suitable information and/or methods disclosed herein. If the request is granted at block 1408, the particular mode identified in the request is set as the downlink data transmission mode to the UE at block 1410. Alternatively, if the request is denied at block 1408, the scheduler can determine whether to adjust a downlink data transmission parameter based on the request at decision block 1412. In response to determining to adjust the downlink data parameter at block 1412, the scheduler can cause a downlink data transmission parameter to be adjusted at block 1414. One or more of the following downlink data transmission parameters can be adjusted: power, time, frequency, or direction. Alternatively or additionally, active set data can be adjusted without granting the request.

At block 1416, active set data is transmitted to the UE. The active set data can include any suitable data that identifies an active set. The active set data can identify the active set for the UE. In some instances, the active set data can identify changes to the active set for the UE. According to certain instances, the active set data can indicate that the active set for the UE is unchanged. In response to the particular mode being set as the downlink data transmission mode at block 1410, the active set data transmitted at block 1416 can identify the desired active set provided by the UE as the active set for the UE. In response to the request being denied at block 1408 and the determination not to adjust downlink data transmission at block 1412, the active set data transmitted at block 1416 can indicate that the active set is unchanged. In response to the request being denied at block 1408 and the determination to adjust downlink data transmission at block 1412, the active set data transmitted at block 1416 can indicate that the active set is unchanged in some instances and a change to the active set in some other instances.

At block 1418, downlink data is transmitted to the UE in the downlink data transmission mode determined based on the request and additional network system information. The UE receives the downlink data from the one or more serving nodes in the active set.

Some or all of the process 1400 can be performed repeatedly. Accordingly, the scheduler can set the downlink data transmission mode to the UE based on an up to date request and up to date network system data. The process 1400 can be performed for each UE in communication with a network system. The process 1400 can be performed for two or more different subsets of one or more antennas of the same UE.

Further Embodiments

Additional embodiments are described with reference to FIGS. 15 to 16B. These figures illustrate examples of a heterogeneous MIMO network serving UEs in different modes with active set allocation.

Figure 15:
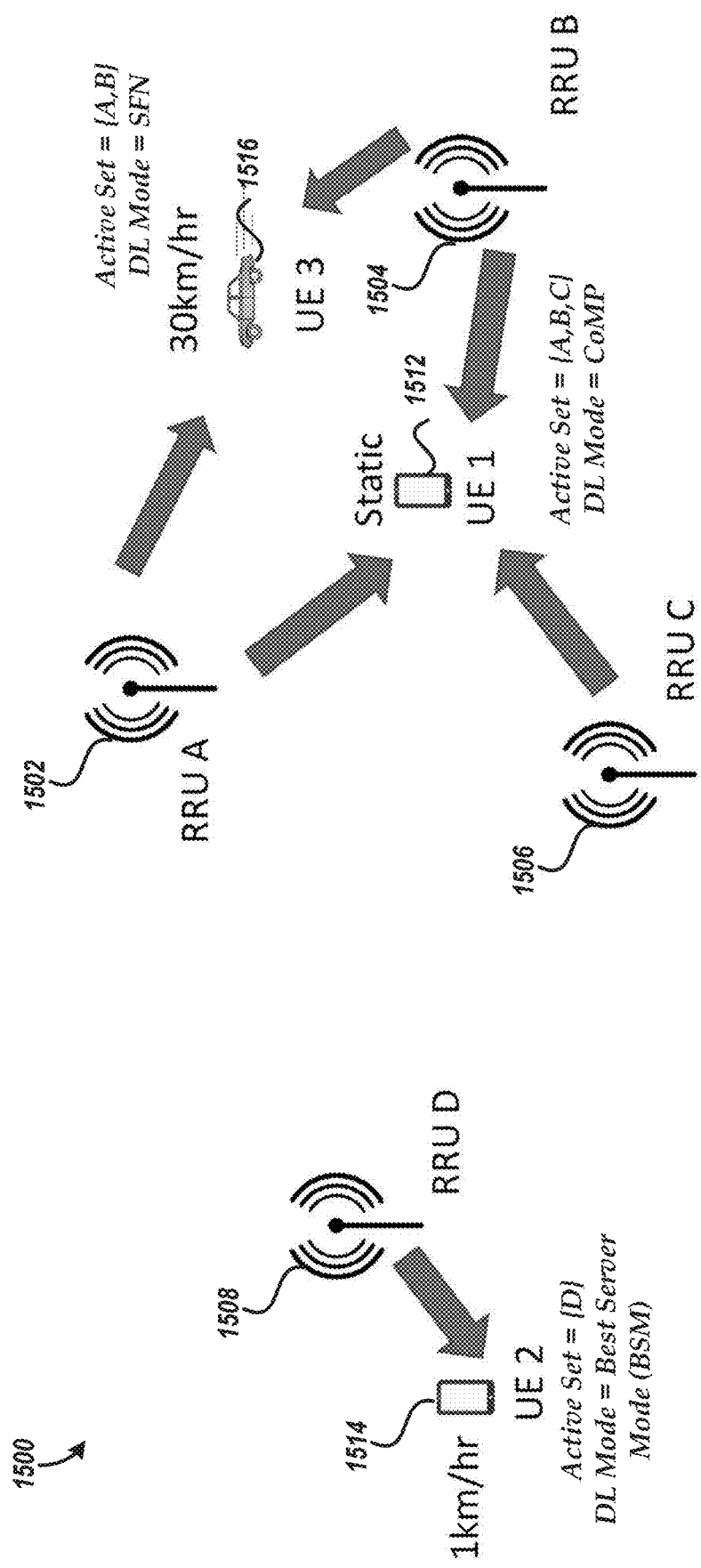
FIG. 15 is a diagram illustrating allocation of active sets and transmission modes in a heterogeneous MIMO environment.

FIG. 15 is a diagram illustrating allocation of active sets and transmission modes in a heterogeneous MIMO environment 1500. This figure illustrates that different UEs can be served in different downlink data transmission modes. As illustrated, the heterogeneous MIMO environment 1500 includes four RRUs 1502, 1504, 1506, and 1508 and three UEs 1512, 1514, and 1516.

The first UE 1512 is static. Thus, the first UE 1512 has low mobility. The first UE 1512 is also near several RRUs 1502, 1504, and 1506. Accordingly, a network system can schedule downlink data transmissions to the first UE 1512 in CoMP mode. The network system can identify RRUs 1502, 1504, and 1506 as the active set of serving nodes for the first UE 1502 in the CoMP mode.

The second UE 1514 is near a single RRU 1508. Without multiple serving nodes available, the network system can schedule downlink data transmissions to the second UE 1514 in an alternative downlink data transmission mode, such as best server mode (e.g., best server selection SIMO, best server selection SU-MIMO, best server selection MU-MIMO). The network system can identify RRU 1508 as the active set for the second UE 1508 in the best server mode.

The third UE 1516 is moving at 30 kilometers per hour. Thus, the third UE 1516 has relatively high mobility. The first UE 1515 is also near RRUs 1502 and 1504. With relatively high mobility and more than one serving node available, the network system can schedule downlink data transmissions to the third UE 1516 in an alternative downlink data transmission mode, such as SFN mode. The network system can identify RRUs 1502 and 1504 as the active set of serving nodes for the third UE 1506 in the SFN mode.

Figure 16A:
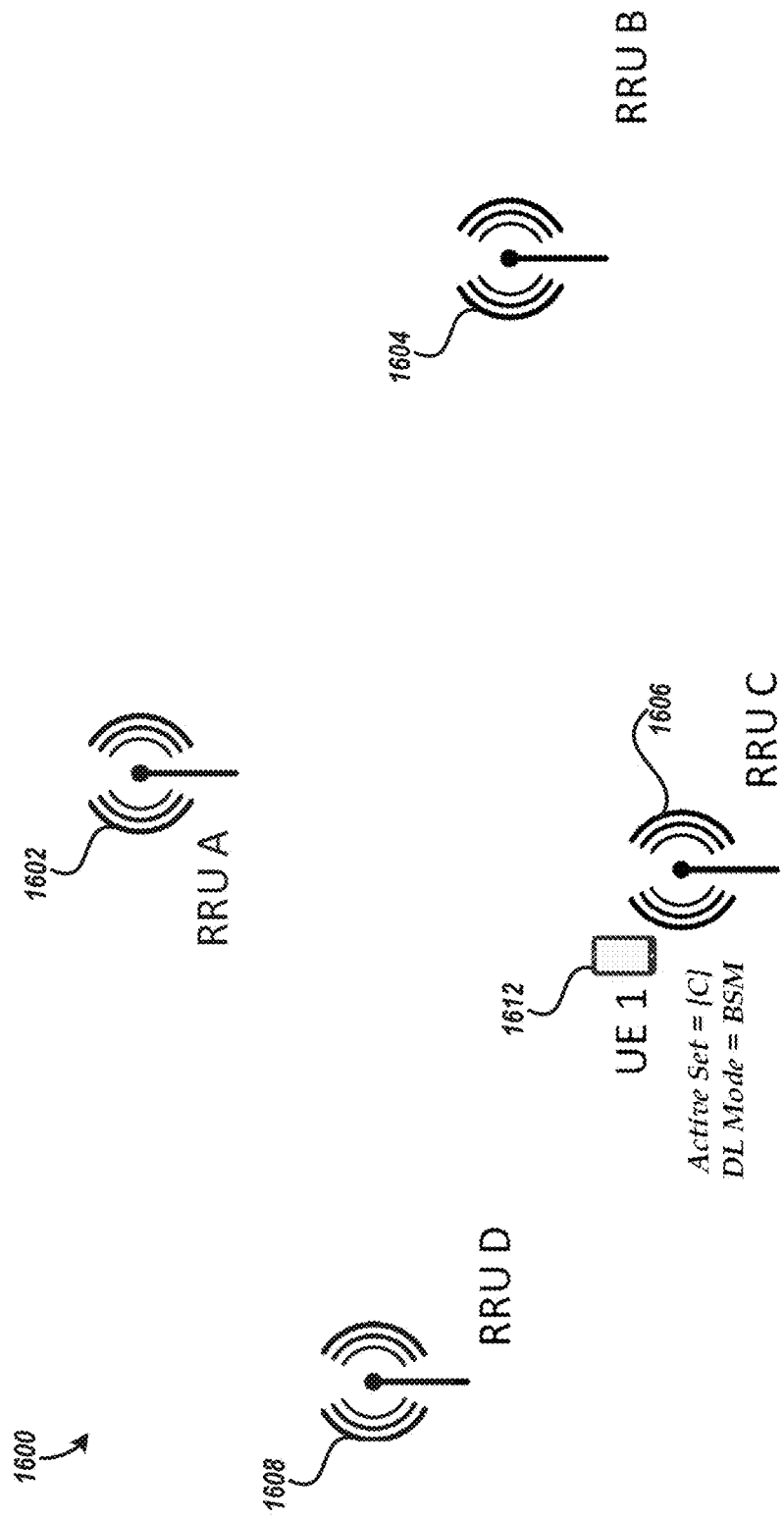
FIG. 16A is a diagram illustrating an active set and transmission mode allocation in a heterogeneous MIMO environment.
Figure 16B:
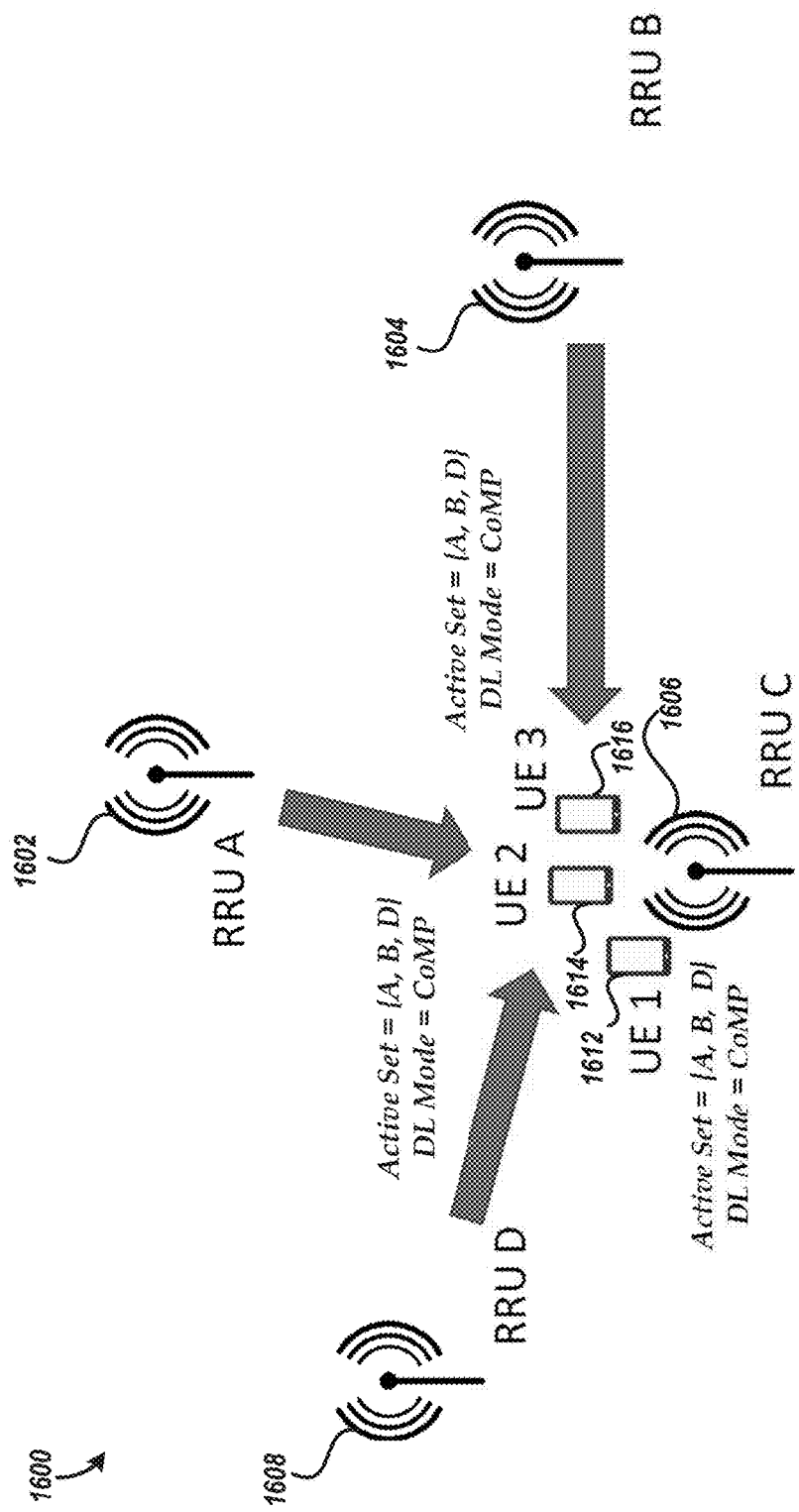
FIG. 16B is a diagram illustrating an updated active set and transmission mode allocation for the heterogeneous MIMO network of FIG. 16A with updated network demands.

FIGS. 16A and 16B are diagrams illustrating different allocations of active sets and transmission modes in a heterogeneous MIMO environment 1600 with dynamic network demands. These figures illustrate that the active set and/or downlink data transmission mode can change due to changing network conditions in a heterogeneous MIMO environment. For instance, the active set and downlink data transmission mode can change as a function of active UEs in the heterogeneous MIMO environment 1600. FIGS. 16A and 16B provide an example in which an active set for a UE can be determined based on network information associated with one or more other UEs.

In FIG. 16A, there is a single UE 1612 in the heterogeneous MIMO environment 1600. As illustrated, the network can schedule downlink data to the UE 1612 in a best server mode with an active set of RRU 1606. The RRUs 1602, 1604, and 1608 can be unused in this case.

Additional UEs can enter the heterogeneous MIMO environment 1600. As shown in FIG. 16B, two additional active UEs 1614 and 1616 are present in the heterogeneous MIMO environment 1600 relative to FIG. 16A. The UEs 1614 and 1616 are both relatively close to the UE 1612 and the RRU 1606. The network can schedule downlink data to each of the UEs 1612, 1614, and 1616 in CoMP mode an active set of RRUs 1602, 1604, and 1608. In FIG. 16A, the active set for the UE 1612 included RRU 1606. However, upon assessment of the changing network conditions (e.g., the additional presence of UE 1614 and UE 1616 and associated wireless communication desires of these UEs), the environment 1600 may be reconfigured to allocate the resources to serve the UE 1612, the UE 1614, and the UE 1616. The reconfiguration may include assigning a new active set of one or more serving nodes such as for UE 1612. Alternatively or additionally, the reconfiguration can include changing a downlink data transmission mode such as for UE 1612 from BSM in FIG. 16A to CoMP in FIG. 16B. The configuration in FIG. 16B can provide improved spatial channel conditions relative to the case where RRU 1606 alone is used to separate beams for three concurrent UEs.

Although the embodiments discussed herein provide various example of operating in the CoMP mode or an alternative downlink data transmission mode, there are numerous use cases where one or another is preferred. Some additional examples will briefly be discussed.

CoMP mode can be preferred for high definition video streaming. CoMP mode can be preferred for downlink data transmission associated with virtual and/or augmented reality. CoMP mode can be preferred for relatively large file transfers. When a UE is in mobility, best server mode can be preferred for high definition video streaming, virtual and/or augmented reality data, and relatively large file transfers.

A soft combining mode can be preferred for relatively low latency high quality audio. Soft combining mode can be preferred for voice calling and video telephony.

A non-coherent combining mode can be preferred for relatively low latency robotic control. For industrial automation control, a non-coherent combining mode can be preferred. Advanced driver assistance systems (ADAS) can prefer a non-coherent combining mode.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of controlling downlink data transmission, the method comprising:
   determining to wirelessly transmit to a user equipment in a coordinated multipoint mode based at least in part on (i) channel state information associated with the user equipment and (ii) a measure of mobility of the user equipment being less than a threshold;
   causing wireless transmission of active set data to the user equipment, the active set data identifying serving nodes for transmitting downlink data to the user equipment in the coordinated multipoint mode; and
   causing wireless transmission of the downlink data to the user equipment from the serving nodes in the coordinated multipoint mode.

2. The method of claim 1, further comprising determining to wirelessly transmit to a second user equipment in an alternative downlink transmission mode based at least in part on channel state information associated with the second user equipment and a measure of mobility of the second user equipment.

3. The method of claim 2, wherein the measure of mobility of the user equipment indicates lower mobility than the measure of mobility of the second user equipment.

4. The method of claim 2, wherein the channel state information associated with the user indicates lower channel state variation than the channel state information associated with the second user equipment.

5. The method of claim 2, wherein the alternative downlink transmission mode is a macro diversity mode.

6. The method of claim 1, further comprising determining to wirelessly transmit second downlink data to the user equipment in an alternative downlink transmission mode based at least in part on the user equipment having an updated measure of mobility indicating higher mobility than the measure of mobility of the user equipment.

7. The method of claim 6, further comprising:
   causing wireless transmission of updated active set data to the user equipment, wherein the updated active set data identifies one or more serving nodes for transmitting to the user equipment in the alternative downlink transmission mode; and
   causing wireless transmission of the second downlink data to the user equipment from the one or more serving nodes in the alternative downlink transmission mode.

8. The method of claim 1, further comprising determining to wirelessly transmit second downlink data to the user equipment in an alternative downlink transmission mode based at least in part on an increase in channel state variation associated with the user equipment relative to channel state variation associated with the channel state information.

9. The method of claim 1, wherein the determining to wirelessly transmit to the user equipment in a coordinated multipoint mode is also based at least in part on an estimated relative spectral efficiency for transmitting to the user equipment in coordinated multipoint mode being higher than for an alternative downlink transmission mode.

10. A network system for transmitting downlink data, the network system comprising:
a plurality of serving nodes; and
a scheduler in communication with the plurality of serving nodes, the scheduler comprising a processor and storing instructions, wherein the processor is configured to execute the instructions to:
determine to wirelessly transmit to a user equipment in a coordinated multipoint mode based at least in part on (i) channel state information associated with the user equipment and (ii) a measure of mobility of the user equipment being less than a threshold;
determine to wirelessly transmit to a second user equipment in an alternative downlink transmission mode based at least in part on a measure of mobility of the second user equipment being greater than the threshold, the alternative downlink transmission mode being different than the coordinated multipoint mode;
cause wireless transmission of active set data to the user equipment, the active set data identifying serving nodes for transmitting downlink data to the user equipment in the coordinated multipoint mode; and
cause wireless transmission of the downlink data to the user equipment from the serving nodes in the coordinated multipoint mode.

11. The network system of claim 10, wherein the processor is further configured to execute the instructions to dynamically determine whether to wirelessly transmit to the user equipment in the coordinated multipoint mode based on changing channel conditions indicated by the channel state information.

12. The network system of claim 10, wherein the alternative downlink transmission mode comprises at least one of: individual network node transmission, synchronized transmission across multiple network nodes for coherent combining, transmissions across multiple network nodes for non-coherent combining, or multiple transmissions for the user equipment to select.

13. The network system of claim 10, wherein the processor is further configured to execute the instructions to determine to wirelessly transmit to a second user equipment in an alternative downlink transmission mode based at least in part on a channel state variation associated with the second user equipment being greater than a second threshold, and wherein the channel state information is associated with channel state variation that is less than the second threshold.

14. The network system of claim 10, wherein the processor is further configured to execute the instructions to determine to wirelessly transmit second downlink data to the user equipment in an alternative downlink transmission mode based at least in part on the user equipment having an updated measure of mobility indicating higher mobility than the measure of mobility of the user equipment.

15. The network system of claim 14, wherein the processor is further configured to execute the instructions to:
cause wireless transmission of updated active set data to the user equipment, wherein the updated active set data identifies one or more serving nodes of the plurality of serving nodes for transmitting to the user equipment in the alternative downlink transmission mode; and
cause wireless transmission of the second downlink data to the user equipment from the one or more serving nodes in the alternative downlink transmission mode.

16. The network system of claim 10, wherein the processor is further configured to execute the instructions to determine to wirelessly transmit second downlink data to the user equipment in an alternative downlink transmission mode based at least in part on an increase in channel state variation associated with the user equipment relative to channel state variation associated with the channel state information.

17. The network system of claim 10, wherein the processor is configured to execute the instructions to determine to wirelessly transmit to the user equipment in a coordinated multipoint mode also based at least in part on an estimated relative spectral efficiency for transmitting to the user equipment in coordinated multipoint mode being higher than for an alternative downlink transmission mode.

18. A method of controlling downlink data transmission, the method comprising:
determining to transmit to a user equipment in a coordinated multipoint mode based on at least (i) mobility of the user equipment being less than a threshold and (ii) additional information; and
while the user equipment has the mobility that is less than the threshold, causing wireless transmission of first downlink data to the user equipment in the coordinated multipoint mode after the determining to transmit the user equipment in the coordinated multipoint mode;
detecting the mobility of the user equipment is greater than the threshold; and
based at least in part on the detecting the mobility of the user equipment is greater than the threshold, causing wireless transmission of second downlink data to the user equipment in an alternative downlink transmission mode, the alternative downlink data transmission mode being different than the coordinated multipoint mode.

19. The method of claim 18, wherein the additional information comprises channel state information associated with the user equipment.

20. The method of claim 19, wherein the determining to operate in the coordinated multipoint mode is also based at least in part on an estimated relative spectral efficiency for transmitting the first downlink data to the user equipment in coordinated multipoint mode being higher than for the alternative downlink transmission mode.

21. The method of claim 18, further comprising:
causing wireless transmission of active set data to the user equipment, wherein the active set data identifies serving nodes from which the user equipment receives the first downlink data in the coordinated multipoint mode;
generating updated active set data identifying one or more serving nodes from which the user equipment receives the second downlink data in the alternative downlink mode; and
causing wireless transmission of the updated active set data to the user equipment.

22. The method of claim 18, wherein the alternative downlink transmission mode comprises at least one of: individual network node transmission, synchronized transmission across multiple network nodes for coherent combining, transmissions across multiple network nodes for non-coherent combining, or multiple transmissions for the user equipment to select.

* * * * *